US012746954B2

(12) United States Patent
Sundberg et al.

(10) Patent No.: US 12,746,954 B2
(45) Date of Patent: Sep. 29, 2026

(54) ELECTRICAL COUPLER FOR A FIRST CAR OF A MULTI-CAR VEHICLE

(71) Applicant: DELLNER COUPLERS AB, Falun (SE)

(72) Inventors: Robin Sundberg, Falun (SE); Anders Westman, Falun (SE); Ivana Radic, Borlänge (SE)

(73) Assignee: DELLNER COUPLERS AB, Falun (SE)

( * ) Notice: Subject to any disclaimer, the term of this patent is extended or adjusted under 35 U.S.C. 154(b) by 897 days.

(21) Appl. No.: 18/011,755

(22) PCT Filed: Jun. 23, 2021

(86) PCT No.: PCT/EP2021/067173
§ 371 (c)(1),
(2) Date: Dec. 20, 2022

(87) PCT Pub. No.: WO2021/260018
PCT Pub. Date: Dec. 30, 2021

(65) Prior Publication Data
US 2023/0227081 A1 Jul. 20, 2023

(30) Foreign Application Priority Data
Jun. 23, 2020 (SE) .................................... 2050743-0

(51) Int. Cl.
*B61G 5/10* (2006.01)
*B61G 5/06* (2006.01)
(Continued)

(52) U.S. Cl.
CPC ................ *B61G 5/10* (2013.01); *B61G 5/06* (2013.01); *B61G 7/00* (2013.01); *B61G 7/06* (2013.01);
(Continued)

(58) Field of Classification Search
CPC ... B61G 5/10; B61G 5/06; B61G 7/00; B61G 7/06; B61G 7/10; H02G 3/083; H02G 3/088; H02G 15/08
(Continued)

(56) References Cited

U.S. PATENT DOCUMENTS 1,790,292 A * 1/1931 Van Dorn ................ B61G 5/10 439/289
3,506,139 A * 4/1970 Cope ........................ B61G 5/10 213/1.3
(Continued)

FOREIGN PATENT DOCUMENTS

CN 1321130 A 7/2001
CN 104494632 A * 4/2015 ............... B61G 7/00
(Continued)

OTHER PUBLICATIONS

Swedish Search Report in SE Application No. 2050743-0 mailed on Feb. 24, 2021, 2 pages.
(Continued)

*Primary Examiner* — S. Joseph Morano
*Assistant Examiner* — James William Jones
(74) *Attorney, Agent, or Firm* — Howard IP Law Group

(57) ABSTRACT

An electrical coupler comprising a housing with an end opening, an insulation block arranged in the end opening, a lid having an open position and a closed position, an arm attached to the lid and to the housing, whereby attachment of the arm to the housing allows a rotation of the arm relative to the housing around a rotational axis, and optionally a series of arms connected to each other to allow one arm to rotate relative to a neighbouring arm. The lid further comprises a housing contact surface that contacts or is in close proximity to a lid contact surface of the housing, a reference line through the point of the lid contact surface furthest away
(Continued)

from the base plane, and wherein a part of the housing contact surface crosses a reference plane closer to the base plane than the reference line is, as the lid is moved from the closed to the open position.

20 Claims, 27 Drawing Sheets

(51) Int. Cl.
*B61G 7/00* (2006.01)
*B61G 7/06* (2006.01)
*B61G 7/10* (2006.01)
*H02G 3/08* (2006.01)
*H02G 15/08* (2006.01)

(52) U.S. Cl.
CPC ............... *B61G 7/10* (2013.01); *H02G 3/083* (2013.01); *H02G 3/088* (2013.01); *H02G 15/08* (2013.01)

(58) Field of Classification Search
USPC .......................... 213/1.3; 238/14.05; 439/289
See application file for complete search history.

(56) References Cited

U.S. PATENT DOCUMENTS 4,957,208 A * 9/1990 Ta ............................ B61G 5/06 439/189
2002/0145290 A1* 10/2002 Stepp ....................... B61G 5/10 292/219
2010/0326942 A1* 12/2010 Dahlstrom ........... H01R 13/428 439/527
2020/0076102 A1 3/2020 Mahugo Criado
2021/0253145 A1* 8/2021 Levi ......................... B61G 5/10

FOREIGN PATENT DOCUMENTS

CN 206012607 U 3/2017
CN 108819975 A * 11/2018 ............... B61G 7/00
DE 19926058 A1 * 12/2000 ............... B61G 5/06
DE 10015420 B4 1/2009
EP 1238882 A2 9/2002
EP 2505450 A1 10/2012
EP 3590785 A1 1/2020
EP 3608196 A1 * 2/2020 ............... B61G 5/10
JP 2002225705 A * 8/2002
JP 2005289108 A * 10/2005
JP 2009234571 A 10/2009
KR 19990005634 U * 2/1999

OTHER PUBLICATIONS

International Search Report and Written Opinion in PCT Application No. PCT/EP2021/067173 mailed on Sep. 28, 2021, 11 pages.

* cited by examiner

ELECTRICAL COUPLER FOR A FIRST CAR OF A MULTI-CAR VEHICLE

CROSS-REFERENCE TO RELATED APPLICATIONS

This application is the national stage application under 35 U.S.C. § 371 of International Application No. PCT/EP2021/067173 filed Jun. 23, 2021, which claims priority to SE 2050743 filed on Jun. 23, 2020, the entire disclosures of which are incorporated herein by reference in their entireties.

FIELD OF INVENTION

The invention relates to an electrical coupler for a first car of a multi-car vehicle. The invention also relates to a coupler for mechanically coupling a first car of a multi-car vehicle to a second car of the multicar vehicle. The invention also relates to a method for assembly of an electrical coupler.

BACKGROUND

Electrical couplers for cars of a multicar vehicle are known from DE 100 15 420 B4. These electrical couplers are typically provided for multi-car vehicles that are trains.

The electrical couplers are often used in conjunction with couplers for mechanically coupling a first car of such a multi-car vehicle to a second car of such a multi-car vehicle. Often the electrical couplers are attached to the main coupler (the coupler that mechanically couples the first car to the second car). The arrangement of the electrical coupler as part of the main coupler has the aim to facilitate the connection of electrical cables from the first car with electrical cables of the second car. In many designs of multi-car vehicles, a plurality of cables is to lead from the first car to the second car, which means that when a first car is connected to a second car, a plurality of connections between cables needs to be made. The electrical couplers like the one known from DE 100 15 420 B4 are used to bring the loose ends of the cables together into one insulation block. In such designs, the intention is that the connection between the plurality of cables can be made by attaching the electrical coupler of the one car (the first car) to the electrical coupler of the neighbouring car (the second car) brings about a connection between all ends of the plurality of cables. Hence the efforts necessary to connect the plurality of cables can be reduce to one connection step.

The electrical coupler to which the invention pertains hence is suitable to be used on a first car of a multicar vehicle. The electrical coupler to which the invention pertains is suitable to be connected to an electrical coupler of a second car of the multi-car vehicle in order to couple the ends of cables of the first car to the ends of the cables of the second car.

The electrical coupler known from DE 100 15 420 B4 has a housing with an end opening. A rim of the housing surrounds the end opening, whereby the housing extends along a longitudinal axis. Designs of the type disclosed in DE 100 15 420 B4 have an insulation block (that is not shown in the FIG. of DE 100 15 420 B4). Such insulation blocks are typically arranged in the end opening. Typically, the insulation blocks have a flat endface that faces towards the outside of the housing. The endface typically is arranged perpendicular to the longitudinal axis of the housing. The endface typically has holes that lead through the insulation block or has recesses that lead into the insulation block.

Typically, the holes or recesses are suitable for the end of at least one cable to be either arranged within the hole or the recess or for at least one cable to be arranged to protrude from the hole or the recess over the endface towards the outside. The flat endface can be said to be situated in an endface plane.

The design of DE 100 15 420 B4 shows a lid that has a closed position, in which the lid is arranged in front of the endface of the insulation block (the insulation block not being shown in DE 100 15 420 B4). The lid also has an open position, in which the lid is arranged along a side of the housing. In the design shown in DE 100 15 420 B4, the lid in the open position is arranged along the top side of the housing.

The electrical coupler of DE 100 15 420 B4 has several arms, whereby each arm is attached to the lid and to the housing. The attachment of each arm to the housing is made in such a manner that the connection of the individual arm to the housing allows the individual arm to rotate relative to the housing around a rotational axis. All arms on one side of the housing rotate about different rotational axis. The arrangement of arms on one side of the housing can be mirrored by further arms being arranged on the opposite side of the housing, whereby an arm on the opposite side of the housing that mirrors an arm on the one side of the housing would be designed to rotate about the same rotational axis as the arm that is being mirrored.

In the design known from the DE 100 15 420 B4 the rotational axis about which one of the two arms is arranged on one side of the housing rotates is orientated parallel to the endface plane (the plane in DE 100 15 420 B4 that the endface of the insulation block would lie in, if DE 100 15 420 B4 would have an insulation block).

The lid of the design of DE 100 15 420 B4 has a housing contact surface that in the closed position of the lid contacts a lid contact surface of the housing, whereby in the design of DE 100 15 420 B4 the lid contact surface of the housing is the most outward facing surface of the sealing 22. FIG. 1 of DE 100 15 420 B4 shows a surface of the lid (which would then be called the housing contact surface of the lid) in contact with the most outward facing part of the sealing 22 (which would then be the lid contact surface of the housing). The lid contact surface is arranged on the rim. In the design known from DE 100 15 420 B4 the sealing 22 forms part of the rim that surrounds the end opening. In the design known from DE 100 15 420 B4 the lid contact surface, namely the most outwardly arranged surface of the sealing 22 runs parallel to the endface plane.

In the design known from DE 100 15 420 B4 a base plane could be defined as being orientated perpendicular to the endface plane and containing one of the rotational axis.

In the design known from DE 100 15 420 B4 a reference line could be defined that runs parallel to the endface plane and runs parallel to such a base plane and runs through the point of the lid contact surface (the most outwardly facing surface of the sealing 22) that is furthest away from the base plane. In the view of FIG. 1 of the DE 100 15 420 B4, such a reference line would be orientated perpendicular to the plane of the paper and would run through the top most part of the sealing 22 in the view of FIG. 1 of DE 100 15 420 B4.

As can be seen from FIG. 3 of DE 100 15 420 B4 efforts need to be taken in the design known from DE 100 15 420 B4 to make sure that all parts of the housing contact surface cross a reference plane that contains the reference line and runs perpendicular to the base plane. While the design of the lid of DE 100 15 420 B4 has further elements that protrude towards the house, namely those parts of the lid that are designed to take up the axis 43 and which are arranged closer to the housing (see FIG. 1) than those surfaces of the lid that are intended to come into contact with the sealing 22 (the housing contact surface) the design of DE 100 15 420 B4 is made in such a manner that it ensures that the housing contact surface of the lid is moved past the sealing 22 with substantial clearance. Such a design on the one hand makes it necessary to move the lid away from the housing substantially as the lid is removed from the closed position to the open position. The kinematics used for the movement of the lid and the design known from DE 100 15 420 B4 also necessitate the complex design of several arms that rotate about several rotational axis.

Given this background, the problem arises to provide an electrical coupler that has a lid that can be moved from the closed position to the open position along a side of the housing in a manner that uses less space and/or by way of a mechanical design that is simple.

SUMMARY

This problem is solved by the electrical coupler, a coupler for mechanically coupling a first car of a multi-car vehicle to a second car of a multi-car vehicle, and a method according to embodiments of the present disclosure.

The invention is based on the idea of breaking with the belief that a lid that is opened from the closed position to an open position along a side of the house needs to be moved with all parts of its housing contact surface around and above the top part of the sealing. In the design according to the invention a part of the housing contact surface crosses the reference plane that contains the reference line and runs perpendicular to the base plane at a point that is closer to the base plane than the reference line is as the lid is moved from the closed position to the open position. In the preferred example, where the reference line is arranged horizontally, the design according to the invention would allow a part of the housing contact surface to cross below the reference line as the lid is moved from the closed position to the open position.

The invention is based on the analysis of the inventors according to which the more a part of the housing contact surface crosses the reference plane closer to the base plane than the reference line, the lesser the lid needs to be moved away from the housing in order to clear a sealing or a lid contact surface on its way from the closed position to the open position, and/or the more the complexity of the movement kinematics of the lid that is necessary to move the lid from the closed position to the open position can be reduced.

The electrical coupler according to the invention has a housing with an end opening whereby a rim of the housing surrounds the end opening and whereby the housing extends along a longitudinal axis. Preferably, the housing is a cast piece, whereby the housing can be cast from metal or can be cast or mould from plastics.

The electrical coupler has an insulation block that is arranged in the end opening. Arranging the insulation block as a separate piece to the housing in the end opening of the housing provides more freedom of design for the material of the insulation block, but also for the geometric design of the insulation block and especially the geometric arrangement of the means that are provided in the insulation block for the end of the cables. Arranging the insulation block as a separate piece within the housing also allows several different designs of insulation blocks to be used with the same housing. Hence based on the same housing, an electrical coupler according to the invention can be specifically adapted to the specific multicar vehicle that it is being used in and the arrangement of cables in the specific multicar vehicle simply by adaptation of the design of the insulation block.

According to the invention the insulation block has a flat endface that faces towards the outside of the housing. Providing such a flat endface provides a clear reference that can be used to design the individual connections between the cables that are to be connected. Connecting an end of a cable with the end of another cable typically is provided for by providing the end of the one cable with a male part of a connection while providing the end of the other cable with a female part of such a connection. The interaction between the male part and the female part necessary to provide a secure connection often is dependent on the length of the distance that the male connector is inserted into the female part of the connector. Providing the insulation block with a reference end by way of the flat endface makes it easier to arrange the male and/or female parts of the individual connections of the individual ends of the cables in relation to this reference. Providing the flat endface of the insulation block also provides a reference for the design of the way, how these two electrical couplers are connected to each other. If the way the connection between these two electrical couplers is designed in such a way that it brings the flat endfaces of the insulation blocks of these electrical couplers into a specific position relative to each other, it can be guaranteed that the connections of the cable are connect in a reliable manner, for example that the male parts of the individual connections are inserted into the female parts of the individual connections by at least a predetermined distance. Alternatively, additional measures at the electrical coupler can be used to define the distance between the endfaces. Such measures can be protruding pins that protrude from the electrical coupler and engage with a socket provided at the other electrical coupler. The design of the pin and the socket can be used to set the compression of any sealing and the engagement of female and male connectors.

The plane that the flat endface is situated in will be referred to as the endface plane.

If as part of the electrical coupler a connection for the end of the cables is used that has a male part that extends along a longitudinal axis or has a female part that is designed to receive a male part that extends along a longitudinal axis, in a preferred embodiment, the endface plane is perpendicular to such a longitudinal axis and/or the longitudinal axis of the housing preferably extends in the same direction/parallel to such a longitudinal axis.

The endface plane according to the invention is arranged perpendicular to the longitudinal axis of the housing and/or the longitudinal axis of the housing is understood to be one axis of the housing that extends perpendicular to the endface plane.

The endface of the insulation block has at least one hole, preferably more than one hole, namely holes that lead through the insulation block or has at least one recess, preferably several recesses that lead into the insulation block, whereby at least one hole or at least one recess is suitable for the end of at least one cable to be either arranged within the hole or the recess or for the end of at least one cable to be arranged to protrude from the hole or the recess over the endface towards the outside. The end of the cable in a preferred embodiment will be either the female part or the male part of a connection of cables that is based on a male part being introduced into a female part. The invention provides for the possibility to have such a female part being arranged within the insulation block. Designs could even be feasible, however, where the female part of the connection protrudes from the insulation block towards the outside. However, given that the insulation block preferably is used to prevent current from jumping from one connection between cables to a connection of different cables, it is preferred that the actual connection between the male part and the female part takes place within the insulation block. Hence, it is preferred, if the female part of a connection of the end of cables is arranged inside the insulation block. Designs are feasible, where one insulation block only has female parts. In such a design, the specific electrical coupler would work together with an electrical coupler of the neighbouring car, where that electrical coupler would only have male parts. Designs are also feasible, however, where the insulation block of one specific electrical coupler has female type connections on some of the ends of the cables and has male parts of the connection on the ends of other cables that are to be connected with that specific electrical coupler. Designs are also feasible, where male type connections are grouped in certain areas of the insulation block and/or female type connections are grouped in other areas of the insulation block. Designs are feasible, where the female connectors are on one side from the midplane and the male connectors on the other. There can also be more complex multiple connectors (for example data bus connectors) and they can be placed on midplane. Arranging the connectors symmetrical around the midplane increases the stability.

According to the invention the electrical coupler has a lid that has a closed position, in which the lid is arranged in front of the endface of the insulation block, and an open position, in which the lid is arranged along a side of the housing. The side of the housing, along which the lid is arranged in the open position, can be chosen dependent on the design of the coupler or the room that exists between the two cars of the multicar vehicle that are to be connected. In a preferred embodiment, the lid is arranged along the top side of the housing (above the housing). However, designs are also feasible, where the lid is arranged along the left side or the right side of the housing or even below the housing in the open position.

In a preferred embodiment, the lid will have a rim and will have further parts of the housing arranged inside this rim, which are offset relative to the rim. The lid hence can have a trough shape, with the rim being the part that protrudes the foremost into one direction, while a surface that is arranged next to that rim, but on the inside of that rim protrudes away from that rim towards a bottom surface of the lid. This trough shape of the lid allows to accommodate for male parts of connections of end of cables that protrude from the endface of the insulation block.

According to the invention and in a first alternative of the invention an arm is attached to the lid and to the housing, whereby the attachment of the arm to the housing allows a rotation of the arm relative to the housing around a rotational axis. This alternative of the invention as regards the number of parts used is the most simple version of the invention, because it can already be implemented with only one single arm. In a preferred embodiment to such a design, a further arm is provided that is arranged on the opposite side of the housing, which arm is also attached to the lid and to the housing, namely to the opposite side of the house, whereby the attachment of this additional arm to the housing allows a rotation of this additional arm relative to the housing around the same rotation axis that the arm rotates about.

In a second alternative of the invention a series of arms is provided. The individual arms of the series of arms are connected to each other in a manner that allows one arm to rotate relative to a neighbouring arm about a rotational axis, whereby one arm of the series of arms is attached to the housing, whereby the attachment of the arm to the housing allows a rotation of the arm relative to the housing around a rotational axis. In a preferred embodiment, the rotational axis about which one arm rotates relative to its neighbouring arm is a different rotational axis to the rotational axis, about which the arm that is attached to the housing rotates about relative to the housing. In the design that provides a series of arms, one arm of the series of arms is attached to the lid. In a preferred embodiment, in the design that operates with a series of arms, the series of arms is made up by two arms.

The attachment of the arm or one arm of the series of arms respectively to the lid can be provided for by making the arm one piece with the lid. The arm can hence be a piece of the lid that protrudes from the lid. In an alternative embodiment, the attachment of the arm to the lid can be provided for by screwing the arm to the lid, bolting the arm to the lid, glue or welding the arm to the lid.

According to the invention, the rotational axis about which the arm that is attached to the housing rotates relative to the housing is orientated parallel to the endface plane.

According to the invention the lid has a housing contact surface that in the closed position of the lid contacts or is in close proximity to a lid contact surface of the housing arranged on the rim of the housing. The lid contact surface at least in part lies in or runs parallel to the endface plane.

Designs of the invention are feasible, where the housing contact surface of the lid is provided for by a surface of a sealing that forms part of the lid. Designs are also feasible, where the lid contact surface of the housing is provided for by a surface of a sealing that forms part of the housing, like for example in the design known from DE 10015 420 B4. If the housing contact surface is provided for by a surface of a sealing, a design of the invention is feasible, where the lid contact surface of the housing is not provided by a sealing, but is a surface of the basic material that the housing is made of (e.g. metal or plastic). In such a design in the closed position the housing contact surface (namely the particular surface of the sealing) would be in contact to and seal against the lid contact surface of the housing. If the lid contact surface is provided for by a surface of a sealing, a design of the invention is feasible, where the housing contact surface of the lid is not provided by a sealing, but is a surface of the basic material that the lid is made of (e.g. metal or plastic). In such a design in the closed position the lid contact surface (namely the particular surface of the sealing) would be in contact to and seal against the housing contact surface of the lid. Designs of the invention are also feasible, where the lid contact surface of the housing is provided by a sealing and the housing contact surface of the lid is provided by a sealing. In such a design in the closed position the two sealings would be in contact.

In a preferred embodiment, the housing contact surface is a surface that is provided by the basic material that the lid is made of (e.g. metal or plastic) and is not provided by a surface of a sealing, while additionally the lid contact surface of the housing is provided by a surface of the basic material of the housing (e.g. metal or plastic) and not provided by a sealing. In a preferred embodiment, the housing contact surface and the lid contact surface are used to define the closed position of the lid. Within this particular embodiment of the invention, the closed position of the lid could be defined to be the position, where the housing contact surface of the lid contacts the lid contact surface of the housing. Having the housing contact surface of the lid rest against the lid contact surface of the housing stabilises the lid against the housing. It can be expected that in such a design the relative movement of the lid relative to the housing is reduced. This can also have a positive effect on a sealing that can be additionally provided. If the position of the lid relative to the housing is stabilised by the contact between the housing contact surface and the lid contact surface a sealing that in a preferred embodiment is additionally provided between the lid and the housing possibly will be in a certain compressed position in the closed position but would not be made to compress or decompress frequently, as it would if the lid would be arranged distant from a housing in a manner that would allow the lid to rattle.

In a preferred embodiment of the invention, the lid has a first housing contact surface and a second housing contact surface, while the housing has a first lid contact surface and a second lid contact surface. In the closed position of the lid, the first housing contact surface is in contact with the first lid contact surface and the second housing contact surface is in contact with the second lid contact surface. In a preferred embodiment, the first lid contact surface is provided for by a surface of sealing that comes into contact with the first housing contact surface that is a surface of the basic material that the lid is made of, while the second lid contact surface is a surface of the basic material that the housing is made of and comes into contact with the first housing contact surface that is a surface of the basic material that the lid is made of. By way of choosing the distance between the first housing contact surface and the second housing contact surface and by way of choosing the distance between the second lid contact surface and the sealing and a surface that the sealing is attached to, this design allows for a precise definition of the room that is available for the sealing and for a defining of the rate that the sealing is compressed. The direct contact between the second housing contact surface and the second lid contact surface defines the relative position of the lid to the housing. This allows the first housing contact surface and the sealing to be arranged in relation to reference points (the second housing contact surface; the second lid contact surface), that in their positions are settled, and hence allows the room for the sealing to be defined.

According to the invention the lid contact surface at least in part lies in or runs parallel to the endface plane. If the lid contact surface is provided by a sealing, the position of the lid contact surface can change; the lid contact surface can have a first position, which it takes up, when the lid is closed, and can have a second position, that is different to the first position, which it takes up, when the lid is opened. If the lid contact surface is provided by a sealing the electrical coupler according to the invention can be designed such that when the lid is moved towards its closed position, the lid with its housing contact surface comes into contact with the lid contact surface prior to having reached its (final) closed position. As the lid continues to move towards its (final) closed position, the lid compresses the sealing and the housing contact surface of the lid pushes the lid contact surface into its first position. When the lid is moved out of its closed position towards its open position, the resilience of the sealing makes the lid contact surface leave its first position and move into its second position. In a preferred embodiment, the second position of the lid contact surface is the position that the lid contact surface takes up, if no compression forces are applied to the sealing.

The electrical coupler according to the invention has a base plane. The base plane is defined as being orientated perpendicular to the endface plane and containing the rotational axis about which the arm that is connected to the housing rotates relative to the housing.

According to the invention, a reference line that lies in or runs parallel to the endface plane and runs parallel to the base plane runs through the point of the lid contact surface that is furthest away from the base plane in one direction. Preferably this “one direction” is a direction perpendicular to the base plane. Preferably “the point of the lid contact surface that is furthest away from the base plane in one direction” is the point of all points of the lid contact surface that are on one side of the base plane that is the furthest away from the base plane in the perpendicular direction to the base plane. Other points of the lid contact surfaces, which are arranged on the other side of the base plane, might be even further away from the base plane. As indicated above, the lid contact surface might have at least two positions (first position, second position). The reference line hence can also have at least two positions as the position of the reference line is dependent on the position of the lid contact surface.

According to the invention part of the housing contact surface crosses a reference plane, that contains the reference line and runs perpendicular to the base plane, at a point closer to the base plane than the reference line is as the lid is moved from the closed position to the open position. If the electrical coupler according to the invention would for example be orientated in such a way that the reference line runs horizontal and the base plane is arranged below the reference line, the invention would provide in this specific orientation of the electrical coupler for a part of the housing contact surface to cross below the reference line as the lid is moved from the closed position to the open position. This rule even applies, if the lid contact surface—by virtue of being a surface of a sealing that is compressed by the lid and decompresses by its own resilience once the lid has been lifted from it—has at least two positions (first position, second position). The advantages of the invention are already achieved, if during the travel of the lid from the closed position to the open position a part of the housing contact surface crosses the reference plane (wherever it might be positioned in that moment of time) at a point closer to the base plane than the reference line is.

In a preferred embodiment, a first reference line lies in or runs parallel to the endface plane and runs parallel to the base plane and runs through the point of a first lid contact surface that is furthest away from the base plane in one direction and a second reference line lies in or runs parallel to the endface plane and runs parallel to the base plane and runs through the point of a second lid contact surface that is furthest away from the base plane in one direction, whereby preferably a part of the housing contact surface crosses a first reference plane that contains the first reference line and runs perpendicular to the base plane at a point closer to the base plane than the first reference line is as the lid is moved from the closed position to the open position and a part (most preferably the same part) of the housing contact surface crosses a second reference plane that contains the second reference line and runs perpendicular to the base plane at a point closer to the base plane than the second reference line is as the lid is moved from the closed position to the open position.

As indicated above, the lid contact surface might have at least two positions (first position, second position). The reference line hence can also have at least two positions as the position of the reference line is dependent on the position of the lid contact surface.

In a preferred embodiment the housing contact surface is a surface of the lid that has a ring shape and encircles a middle part of the lid. The ring that the housing contact surface forms can be a circular ring. The ring can also be a rectangular or polygonal ring. The ring can also be a free-form ring. Embodiments are feasible, where a ring shaped housing contact surface has a constant width. In alternative embodiments, the width of a ring shaped housing contact surface can change along the progression around the ring.

In a preferred embodiment the lid contact surface is a surface of the housing that has a ring shape and encircles a middle part of the housing. The ring that the lid contact surface forms can be a circular ring. The ring can also be a rectangular or polygonal ring. The ring can also be a free-form ring. Embodiments are feasible, where a ring shaped lid contact surface has a constant width. In alternative embodiments, the width of a ring shaped lid contact surface can change along the progression around the ring.

In a preferred embodiment the lid contact surface is ring shaped and as part of the ring has at least one surface section that is longitudinal. A longitudinal surface section is considered to be a surface section that has an extend in a first direction that is at least twice as large than the extend in a second direction, the second direction being perpendicular to the first direction. A longitudinal surface section can be a rectangular surface section, for example.

In a preferred embodiment, the ring shaped lid contact surface can have two longitudinal surface sections that are arranged in parallel to each other, whereby a first end of one of the two longitudinal surface sections is connected to a first end of the other of the two longitudinal surface sections by a first side surface section and a second end of the one of the two longitudinal surface sections is connected to a second end of the other of the two longitudinal surface sections by a second side surface section to form the ring shaped lid contact surface. In a preferred embodiment, the first side surface section has a section that is a longitudinal surface section. In a preferred embodiment, the second side surface section has a section that is a longitudinal surface section.

In a preferred embodiment, the first end of the one of the two longitudinal surface sections is connected to the first side surface section by a rounded surface section (also called “corner piece”). In a preferred embodiment the first side surface section is connected to the first end of the other of the two longitudinal surface sections by a rounded surface section (corner piece). In a preferred embodiment, the second end of the one of the two longitudinal surface sections is connected to the second side surface section by a rounded surface section (also called “corner piece”). In a preferred embodiment the second side surface section is connected to the second end of the other of the two longitudinal surface sections by a rounded surface section (corner piece).

According to the invention, the reference line runs through the point of the lid contact surface that is furthest away from the base plane. In a preferred embodiment, the point of the lid contact surface that is furthest away from the base plane in one direction is a point on a longitudinal surface section. In a preferred embodiment, the lid contact surface has a longitudinal surface section that extends in parallel to the base plane. In an alternative embodiment, the point of the lid contact surface that is furthest away from the base plane in one direction is situated at a peak of the lid contact surface. The peak of the lid contact surface can, for example, be created by a first longitudinal partial surface section of the lid contact surface that joins with a second longitudinal partial surface section of the lid contact surface at the peak, whereby the first longitudinal partial surface section is arranged at an angle to the second longitudinal partial surface section. The angle in a preferred embodiment is a shallow angle. The angle can for example be less than 170°, preferably less than 160°, preferably less than 150°, preferably less than 130°. The peak of the lid contact surface can, for example, be created by an arched shaped surface section of the lid contact surface, whereby the peak is the apex of the arched shaped surface section. If the lid contact surface has the shape of a circular ring, the peak is that part of the circular ring that is furthest away from the base plane in a direction perpendicular to the base plane.

In a preferred embodiment, the ring-shaped lid contact surface has a maximum-width plane that is parallel to the reference line and equal to or parallel to the base plane. The ring-shaped lid contact surface crosses the maximum-width plane twice, once with one part of the ring and once with the opposite part of the ring. In the maximum-width plane, the two parts of the ring that cross the plane are arranged the furthest away from each other compared to the distance that other parts of the ring-shaped lid contact surface, that cross other planes that run in parallel to the maximum-width plane, are spaced apart from each other. Or put differently: as regards the width of the ring that forms the ring-shaped lid contact surface in the direction parallel to the reference line, the ring has its largest width in the maximum-width plane.

In a preferred embodiment, where the ring shaped lid contact surface has two longitudinal surface sections that are arranged in parallel to each other, whereby a first end of one of the two longitudinal surface sections is connected to a first end of the other of the two longitudinal surface sections by a first side surface section and a second end of the one of the two longitudinal surface sections is connected to a second end of the other of the two longitudinal surface sections by a second side surface section to form the ring shaped lid contact surface and the first side surface section has a section that is a longitudinal surface section and the second side surface section has a section that is a longitudinal surface section the longitudinal surface section of the first side surface and the longitudinal surface section of the second side surface are arranged on the other side of the maximum-width plane than the reference line; the longitudinal surface section of the first side surface and the longitudinal surface section of the second side surface are, for example, arranged below the maximum-width plane, if the reference line is arranged above the maximum-width plane. In a preferred embodiment, the sections of the lid contact surface that are arranged between the maximum-width plane and the reference line do not run perpendicular to the maximum-width plane. In a preferred embodiment, the sections of the lid contact surface that are arranged between the maximum-width plane and the reference line converge towards the point of the lid contact surface that is furthest away from the base plane. If the point of the lid contact surface that is furthest away from the base plane in one direction part of a longitudinal section of the lid contact surface that runs parallel to the base plane, it is preferred, if the sections of the lid contact surface that are arranged between the maximum-width plane and the reference line converge towards the ends of this longitudinal section of the lid contact surface.

In a preferred embodiment the distance from the maximum-width plane to the base plane is shorter than the distance from the maximum-width plane to the reference line. In a preferred embodiment, the maximum-width plane is the base plane.

The arrangement of the housing contact surface in close proximity to a lid contact surface is understood for the housing contact surface to be distanced apart from the lid contact surface by not more than 10 mm, preferably not more than 7 mm, preferably not more than 5 mm, preferably not more than 3 mm.

In a preferred embodiment, the housing contact surface runs in parallel to the lid contact surface. In a preferred embodiment, the housing contact surface is arranged completely in one plane. In a preferred embodiment, the lid contact surface is arranged in one plane.

In a preferred embodiment the electrical coupler has a series of two arms, namely a first arm and a second arm, whereby the first arm is attached to the housing, whereby the attachment of the first arm of the housing allows a rotation of the first arm relative to the housing around a main axis and whereby the first arm and the second arm are connected to each other in a manner that allows the first arm to rotate relative to the second arm about a second axis, whereby the second arm is attached to the lid. In a preferred embodiment, the main axis and the second axis are in parallel to each other.

In a preferred embodiment, the first arm has a first end, whereby a roller is attached to the first end. In this preferred embodiment the first arm has a second end that is opposite the first end, whereby the second end is attached to the second arm. In this embodiment the attachment of the first arm to the housing is arranged between the first end and the second end.

In a preferred embodiment the electrical coupler has a support frame, whereby the housing is supported by the support frame, but can slide relative to the support frame.

In a preferred embodiment a stationary guide rail that is part of the support frame is provided, whereby the roller is arranged in the guide rail and moves along the guide rail as the housing slides relative to the support frame.

In a preferred embodiment, a spring is provided that is attached at one end to the arm or one of the arms of the series of arms respectively and at the other end is attached to the housing.

In a preferred embodiment the housing has an entry opening that is arranged opposite to the end opening. In a preferred embodiment the insulation blocks can be inserted into the housing through the entry opening. Designs are feasible, where the insulation block after having been inserted in the entry opening and slide through the housing is moved out a bit from the end opening. In this position the sealing can be added and then the insulation block is pressed back into the end opening.

In a preferred embodiment, an electrical coupler according to the invention that has an entry opening and also has a back piece that can be used to close the entry opening.

In a preferred embodiment, a sealing can be arranged between an outer circumferential surface of the insulation block and an inner circumferential surface of the housing. In a preferred embodiment, this sealing is one-piece with a sealing that forms part of the rim and that provides the lid contact surface. Such a sealing can be a sealing with two bulges, each of the bulges being ring-shaped, the two ring-shaped bulges being arranged in parallel to each other and connected to each other by a connecting wall.

In a preferred embodiment, the insulation block has a recess on its outer circumferential surface and the housing has a hole, whereby a screw or bolt or pin is inserted into the hole such that it protrudes inwards from the inner circumferential surface of the housing and engages with the recess in the insulation block. This allows the insulation block to be attached to the housing and the position of the insulation block within the housing to be fixed.

In a preferred embodiment the recess can also hold a block that the screw, bolt or pin is inserted into.

In a preferred embodiment, the insulation block is made as one piece. In an alternative, likewise preferred embodiment, the insulation block is made up of at least two sub-blocks that are attached to each other.

In a preferred embodiment the ends of at least 5 cables, preferably of at least 10, preferably of at least 15 cables are attached the insulation block.

The coupler for mechanically coupling a first car of multi-car vehicle to a second car of the multi-car vehicle according to the invention has an electrical coupler according to the invention.

In the method for assembly of the electrical coupler according to the invention it is provided that an end of a cable is attached to a hole or a recess of the insulation block to be either arranged within the hole of the recess or arrange to protrude from the hole or the recess of the endface towards the outside, while the insulation block is outside of the housing. The method according to the invention provides that the insulation block is inserted through the entry opening into the housing and that the insulation block is attached to the housing such that the insulation block is arranged in the end opening. The method according to the invention hence allows for the attachment of the end of the cables to the insulation block to be performed while the insulation block is outside the housing. This method step allows the worker to have more space for handling the cables and for the performance of the steps necessary to attach the end of the cable to the insulation block. This method step also allows the worker to check that the end of the cables have been attached to the insulation block in a correct manner.

BRIEF DESCRIPTION OF THE DRAWINGS

The invention will be described below with reference to figures that only show exemplary embodiments. In these drawings the following is shown.

DETAILED DESCRIPTION

Figure 1A:
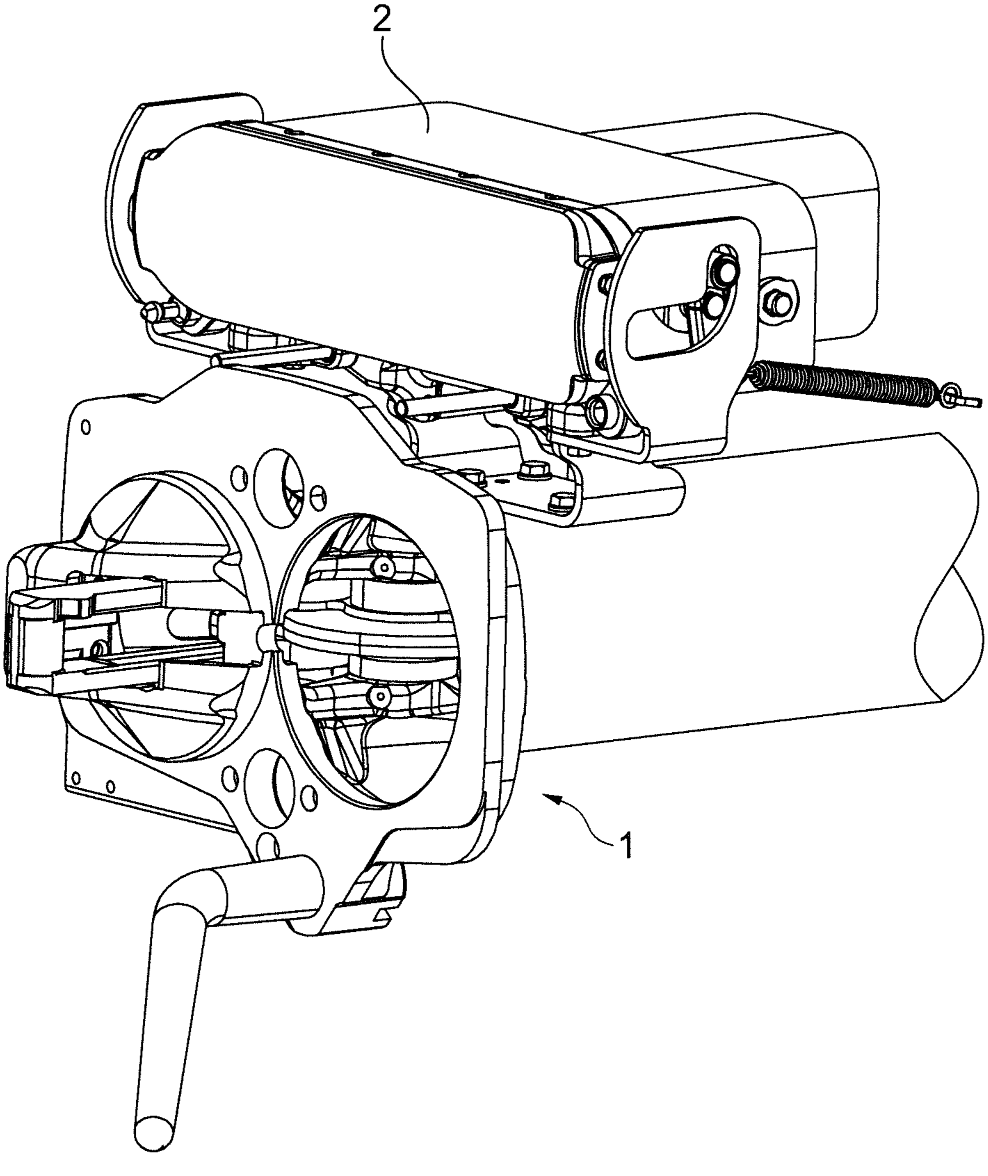
FIG. 1*a*, 1*b* are schematic perspective views of a coupler for mechanically coupling a first car of multi-car vehicle to a second car the multi-car vehicle according to the invention that has an electrical coupler according to the invention.
Figure 1B:
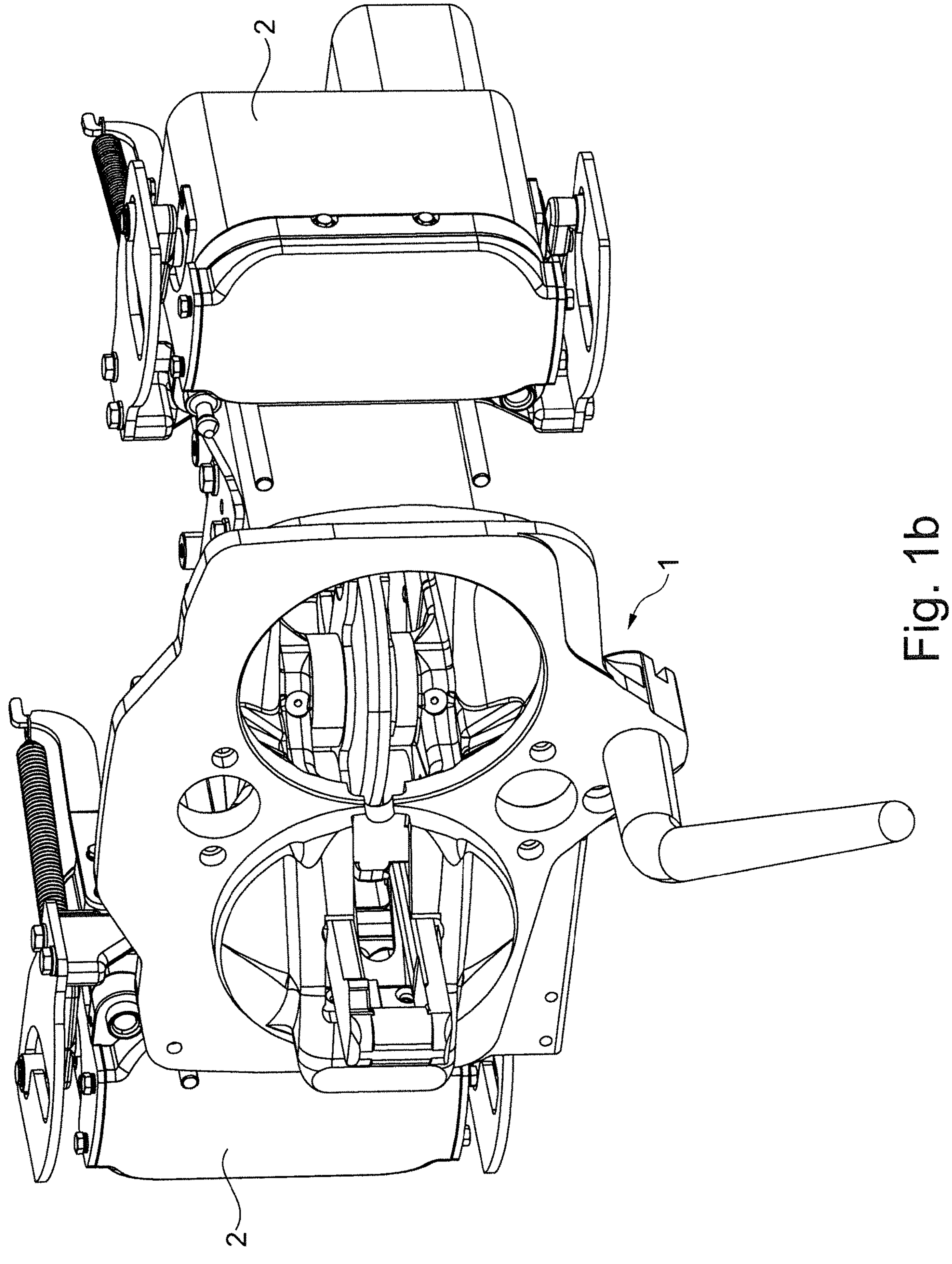

FIG. 1*a, b* shows two possible designs of a coupler 1 for mechanically coupling a first car of a train to a second car of the train. In FIG. 1*a*, an electric coupler according to the invention for such a first car of such a train is attached to the coupler 1 and arranged above the coupler 1. In the FIG. 1*b*, two electrical couplers according to the invention are provided. One electrical coupler is arranged at each side of the coupler 1.

Figure 2:
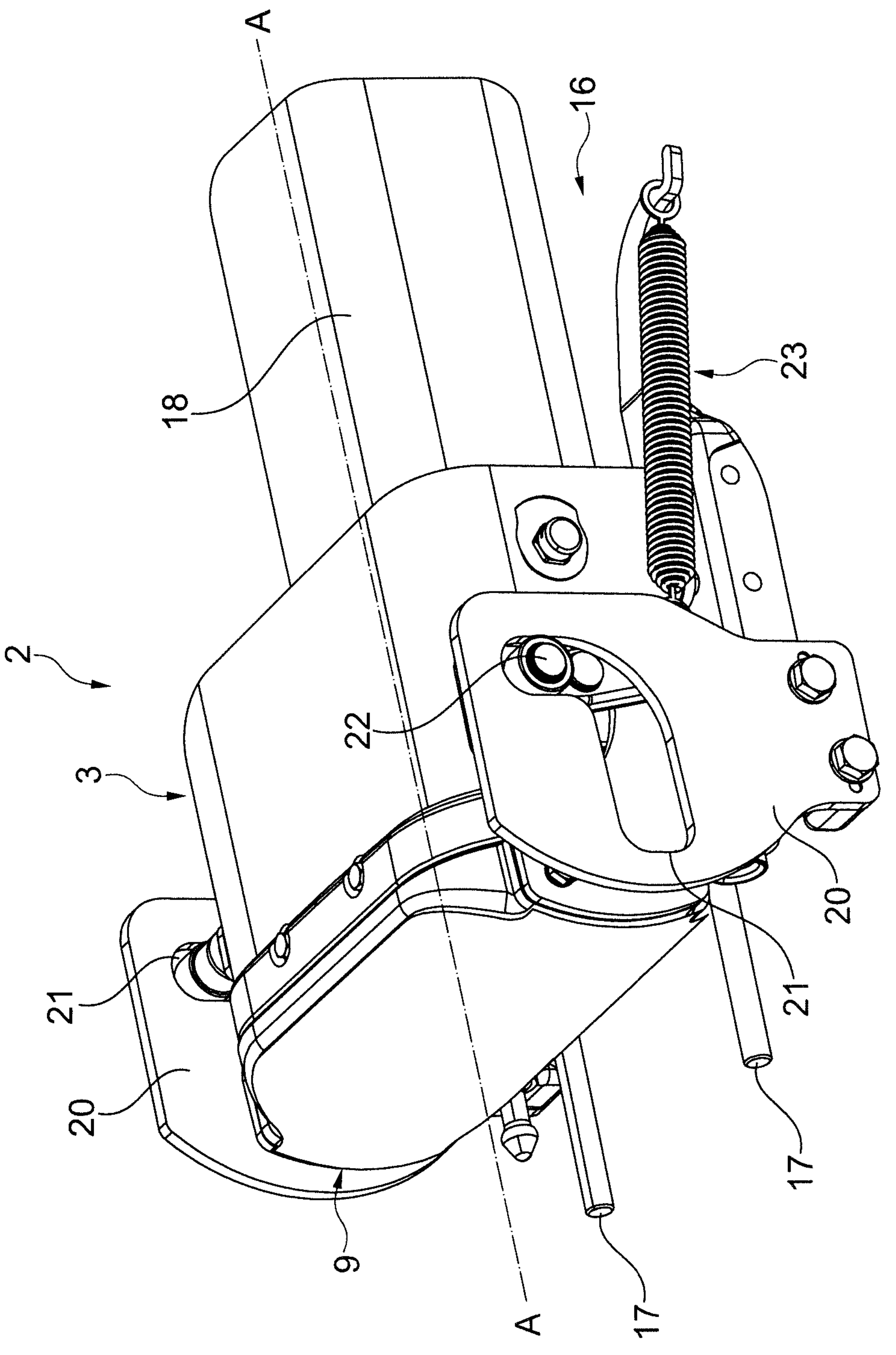
FIG. 2 is a schematic perspective view of an electrical coupler according to the invention with the lid in the closed position.

FIG. 2 shows the electrical coupler 2. The electrical coupler 2 comprises a housing 3. The housing 3 has an end opening 4. A rim 5 of the housing 3 surrounds the end opening 4. The housing 3 extends along a longitudinal axis A.

An insulation block 6 is arranged in the end opening 4. The insulation block 6 has a flat endface 7 that faces towards the outside of the housing 3. The flat endface 7 is arranged perpendicular to the longitudinal axis A of the housing 3. The endface 7 has holes 8 that lead through the insulation block 6.

The flat endface 7 is situated in an endface plane B.

Figure 3:
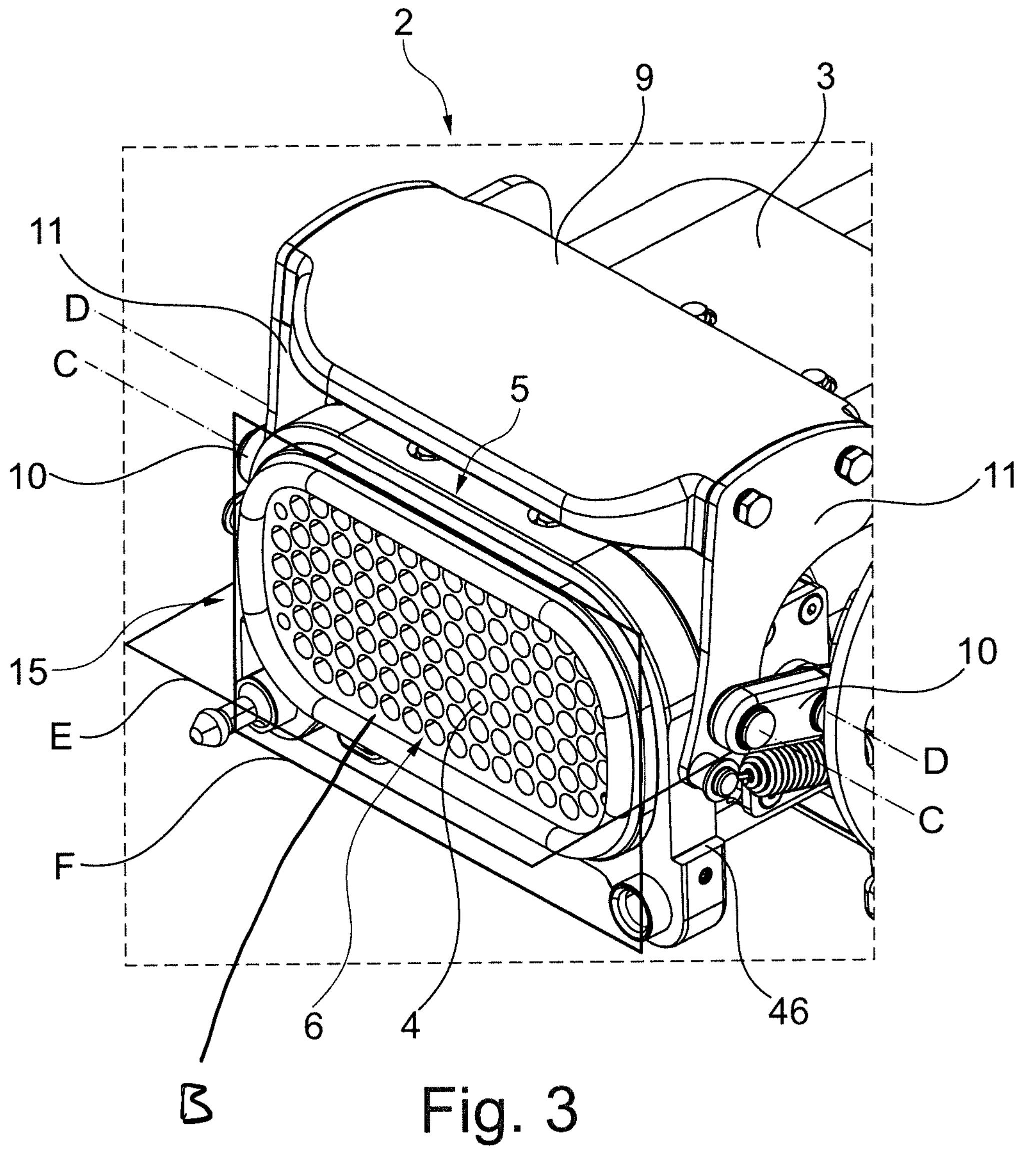
FIG. 3 is a schematic perspective view of the electrical coupler of FIG. 2 in a close-up with the lid in the open position.

A lid 9 is provided that has a closed position, which is shown in FIG. 2, in which the lid 9 is arranged in front of the endface 7 of the insulation block 6. In an open position of the lid 9, which is shown in FIG. 3, the lid 9 is arranged along the top side of the housing 3.

A first arm 10 and a second arm 11 from a series of arms are shown that are connected to each other in a manner to allow the first arm 10 to rotate relative to the neighbouring arm, namely the second arm 11 about a rotational axis C. The first arm 10 of the series of arms is attached to the housing 3. The attachment of the first arm 10 to the housing 3 allows a rotation of the first arm 10 relative to the housing 3 around a rotational axis D. One arm of the series of arms, namely the second arm 11 is attached to the lid 9. The rotational axis D, about which the first arm 10 rotates relative to the housing 3 is orientated parallel to the endface plane B.

The lid 9 has a housing contact surface 12. In the closed position of the lid 9 the housing contact surface 12 contacts a lid contact surface 13 of the housing 3. The lid contact surface 13 is arranged on the rim 5. The lid contact surface 13 at least in part runs parallel to the endface plane B.

A base plane E is defined as being orientated perpendicular to the endface plane B and containing the rotational axis D.

A reference line 14 runs parallel to the endface plane B and runs parallel to the base plane E. The reference line 14 runs through the point of the lid contact surface 30 that is furthest away from the base plane in one direction E.

A part of the housing contact surface 12 crosses a reference plane F that contains the reference line 14 and runs perpendicular to the base plane E at a point closer to the base plane E than the reference line 14 is as the lid 9 is moved from the closed position to the open position.

FIG. 3 shows the electrical coupler 2 with the lid 9 in the open position, in which the lid 9 is arranged along the top side of the housing 3.

FIG. 3 shows that the rim 5 contains a sealing 15. FIG. 3 also shows that the rim 5 and the sealing 15, that forms part of the rim 5, surround the end opening 4 like a ring. FIG. 3 also shows that a series of arms that is made up of a first arm 10 and a second arm 11.

FIG. 2 shows that the electrical coupler 2 has a support frame 16. The housing 3 is supported by the support frame 16, but can slide relative to the support frame 16. The support frame 16 contains two bars 7 that function as rails, on which the housing 3 slides relative to the support frame 16. The support frame 16 further contains a hydraulic cylinder 18 that is attached to a base frame 19 of the support frame 16. The bars 17 are also attached to the base frame 19. The piston of the hydraulic cylinder 18 is in contact with the housing 3. Driving the piston of the hydraulic cylinder 18 outwards leads to a sliding movement of the housing 3 along the bars 17 towards the left in FIG. 2. Pulling in the piston of the hydraulic cylinder 18 leads to the housing 3 to be slid along the bars 17 towards the right in FIG. 2.

The support frame 16 has two plates 20. Each plate 20 has a stationary guide rail 21. A roller 22, which is attached to the first end of the first arm 10, is arranged in the stationary guide rail 21 and moves along the guide rail 21 as the housing 3 slides relative to the support frame 16.

Figure 6:
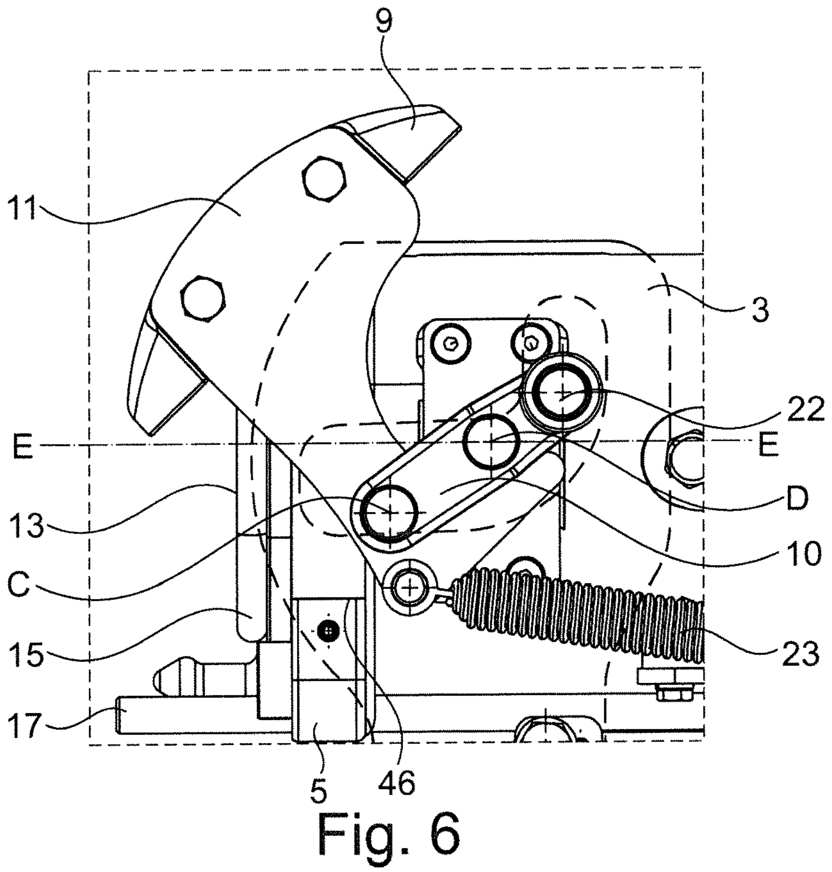
FIG. 6 is a schematic side view onto the electrical coupler according to FIG. 2 with the lid opened half way.

As can be seen from FIG. 6 a spring 23 is provided that is attached at one end to one of the arms of the series of arms, namely to the second arm 11 and at the other end is attached to the housing 3.

Figure 4:
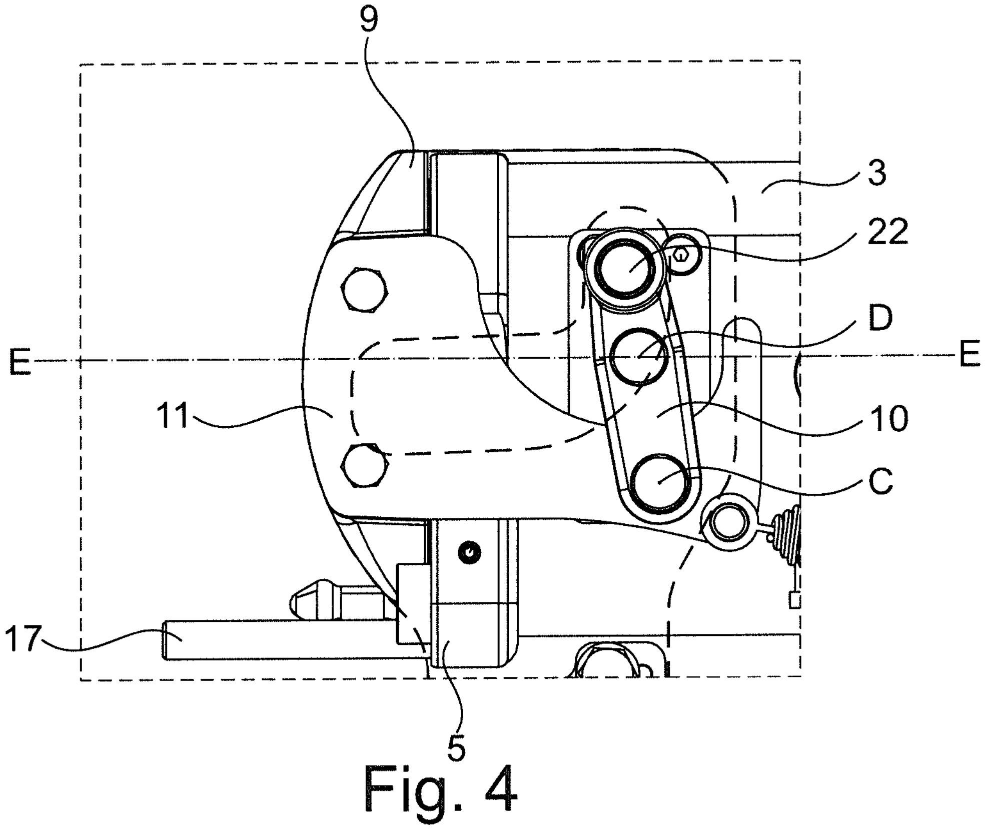
FIG. 4 is a schematic side view onto the electrical coupler according to FIG. 2 with the lid in the closed position.
Figure 5:
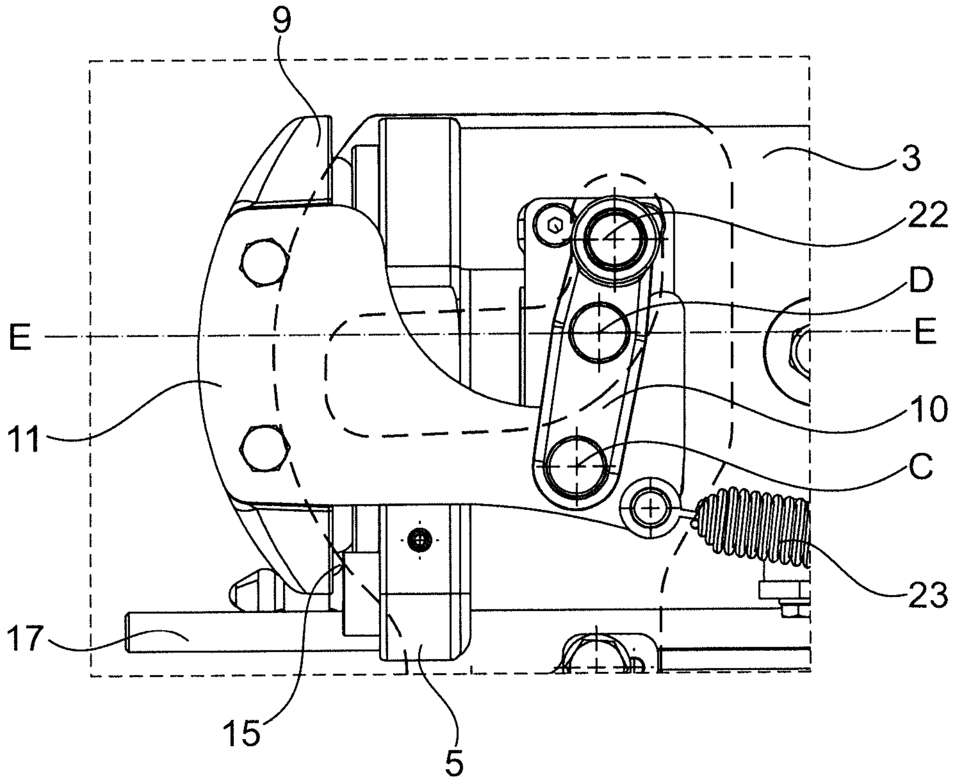
FIG. 5 is a schematic side view onto the electrical coupler according to FIG. 2 with the lid a little opened.
Figure 7:
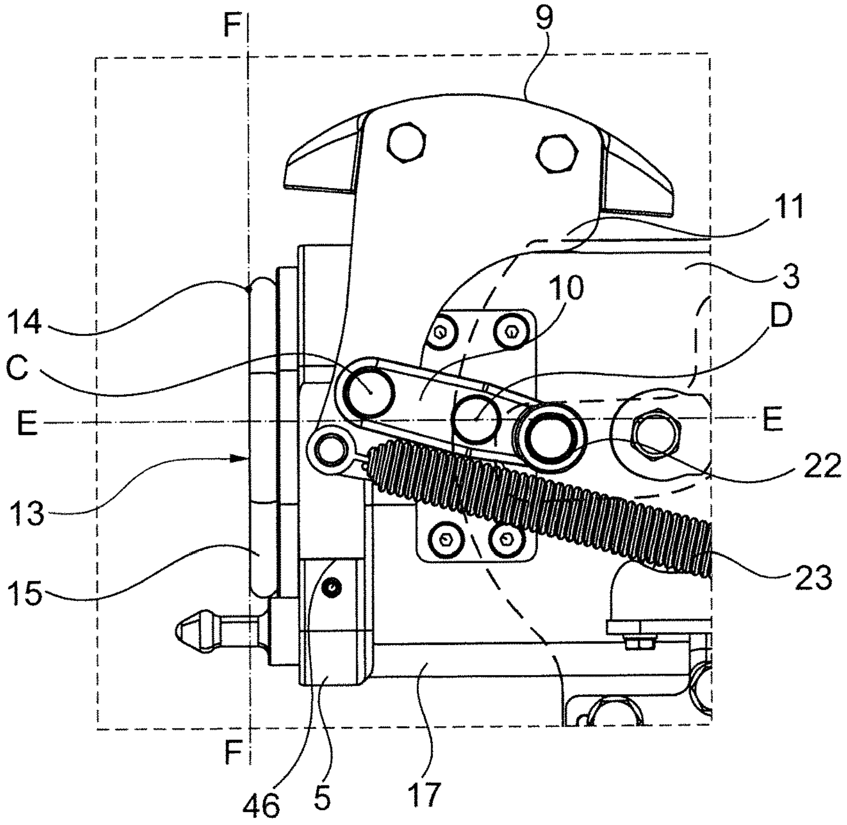
FIG. 7 is a schematic side view onto the electrical coupler according to FIG. 2 with the lid in the opened position.

FIG. 4, FIG. 5, FIG. 6 and FIG. 7 show an opening sequence of the lid 9 of the electrical coupler 2. FIG. 4 shows the electrical coupler in the closed position of the lid 9 (the position shown in FIG. 2). FIG. 7 shows the open position of the lid 9. FIG. 5 and FIG. 6 show intermediate steps as the lid is being moved from the closed position (FIG. 4, FIG. 2) to the open position (FIG. 3, FIG. 7). As indicated by its relation to the bars 17, which in FIG. 4 and FIG. 5 continue towards the left (ends of the bars 17 not shown in FIG. 4, FIG. 5), and in FIG. 6 are shown having ends and in FIG. 7 are shown arranged within a supporting structure of the rim 5 in FIG. 7, the housing 3 has slid from a position as shown in FIG. 4, where the housing 3 would be arranged towards one end of the bars 17 (a position towards the right in FIG. 12) to a position, where the housing is closer to the opposite end of the bars 17 (the position shown in FIG. 3, FIG. 7). The sequence of the FIG. 4 to FIG. 7 hence shows that pushing of the housing 3 along the bars 17 leads to a movement of the lid 9 from the closed position (FIG. 4) to the open position (FIG. 7).

FIGS. 4 to 7 have been drawn without the plates 20 and the stationary guide rail 21 arranged in this plate and also with the second arm 11 being see through, which has been done to simplify for the explanation of the movements.

As indicated in FIGS. 6 and 7, the lid contact surface 13 is the foremost surface of the sealing 15. FIG. 6 and FIG. 7 also show that the lid contact surface 13 lies in one plane: In the embodiment shown in FIG. 7, the lid contact surface 13 lies in the reference plane F.

As can be seen from FIG. 3 to FIG. 7, the embodiment shown here as a series of two arms, namely a first arm 10 and a second arm 11, whereby the first arm 11 is attached to the housing 3, whereby the attachment of the first arm 10 to the housing 3 allows a rotation of the first arm 10 relative to the housing 3 around a main axis, namely the rotational axis D, and whereby the first arm 10 and the second arm 11 are connected to each other in a manner that allows the first arm 10 to rotate relative to the second arm 11 about a second axis, namely the rotational axis C, whereby the second arm 11 is attached to the lid 9. FIGS. 3 to 7 also show that the first arm 10 has a first end, whereby the roller 22 is attached to the first end and whereby the first arm 10 has a second end that is opposite the first end, whereby the second end is attached to the second arm 11, whereby the attachment of the first arm 10 to the housing 3 is arranged between the first end and the second end.

Figure 8:
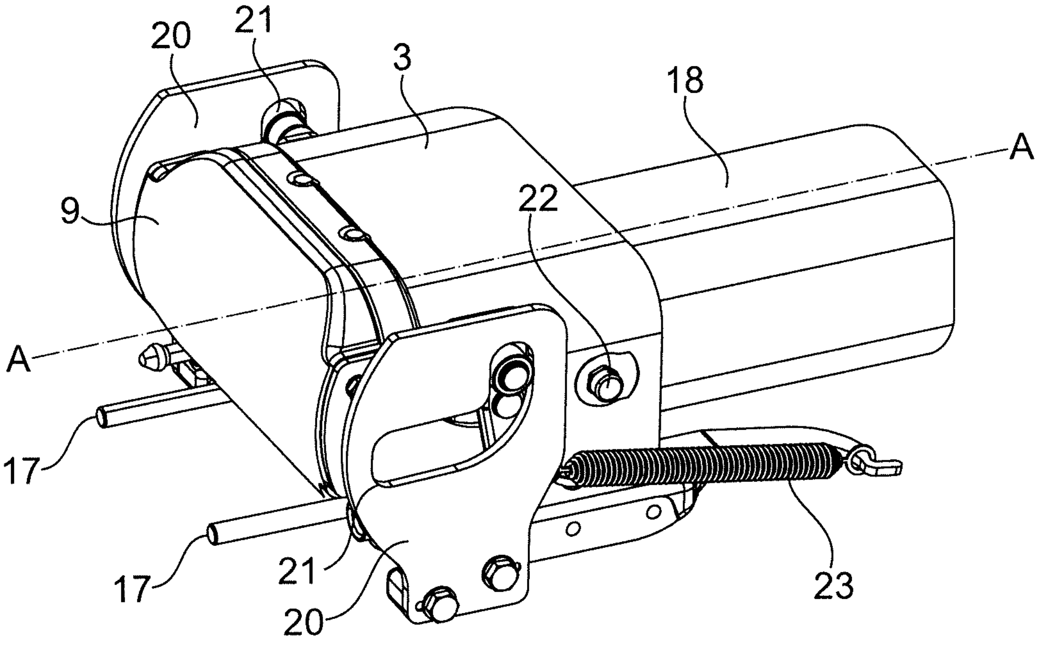
FIG. 8 is a schematic perspective view onto the electrical coupler according to FIG. 2 with the lid in the closed position.
Figure 9:
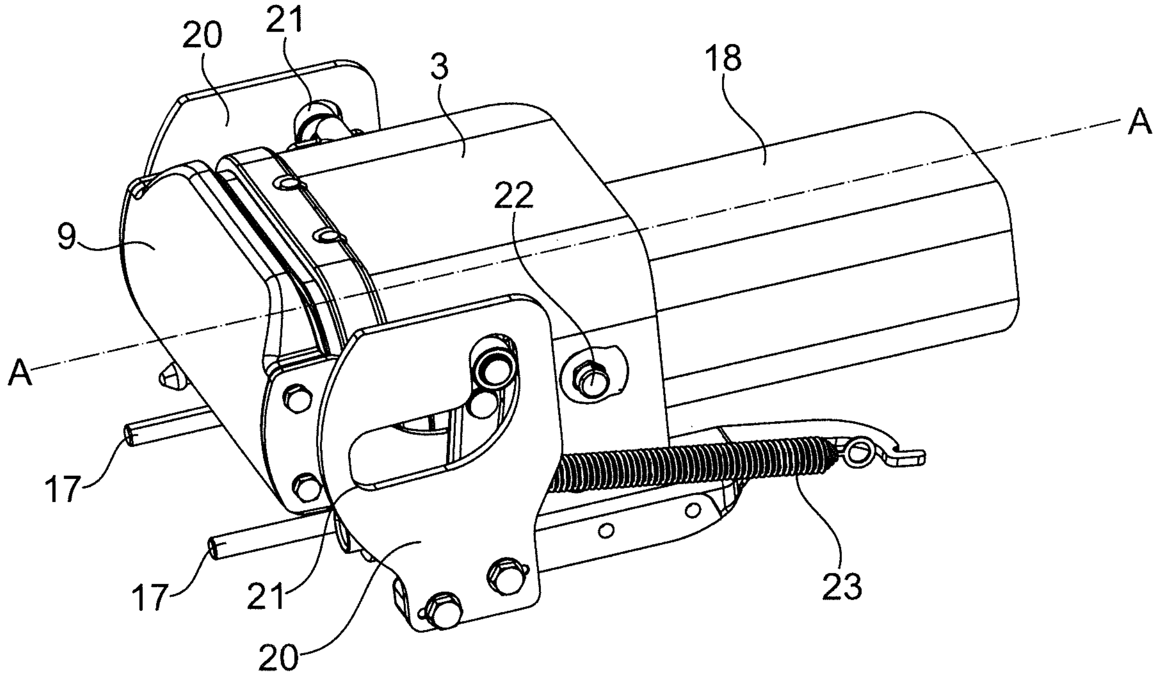
FIG. 9 is a schematic perspective view onto the electrical coupler according to FIG. 2 with the lid a little opened.
Figure 10:
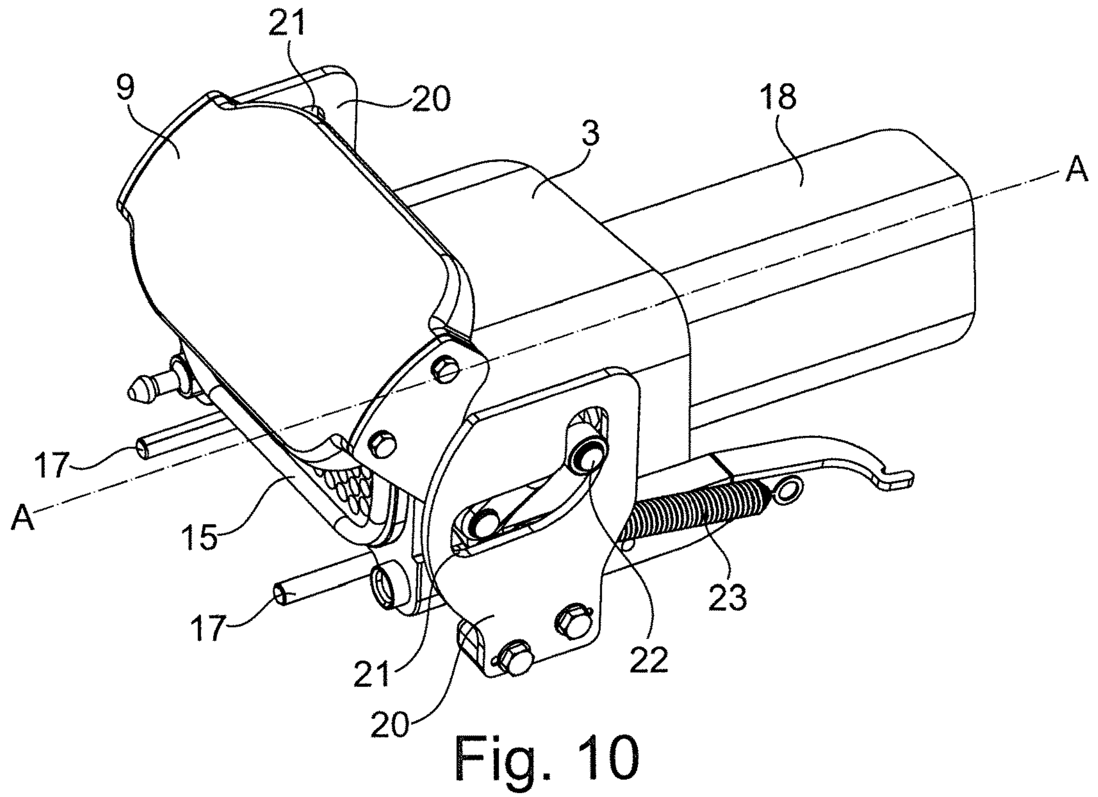
FIG. 10 is a schematic perspective view onto the electrical coupler according to FIG. 2 with the lid opened half way.
Figure 11:
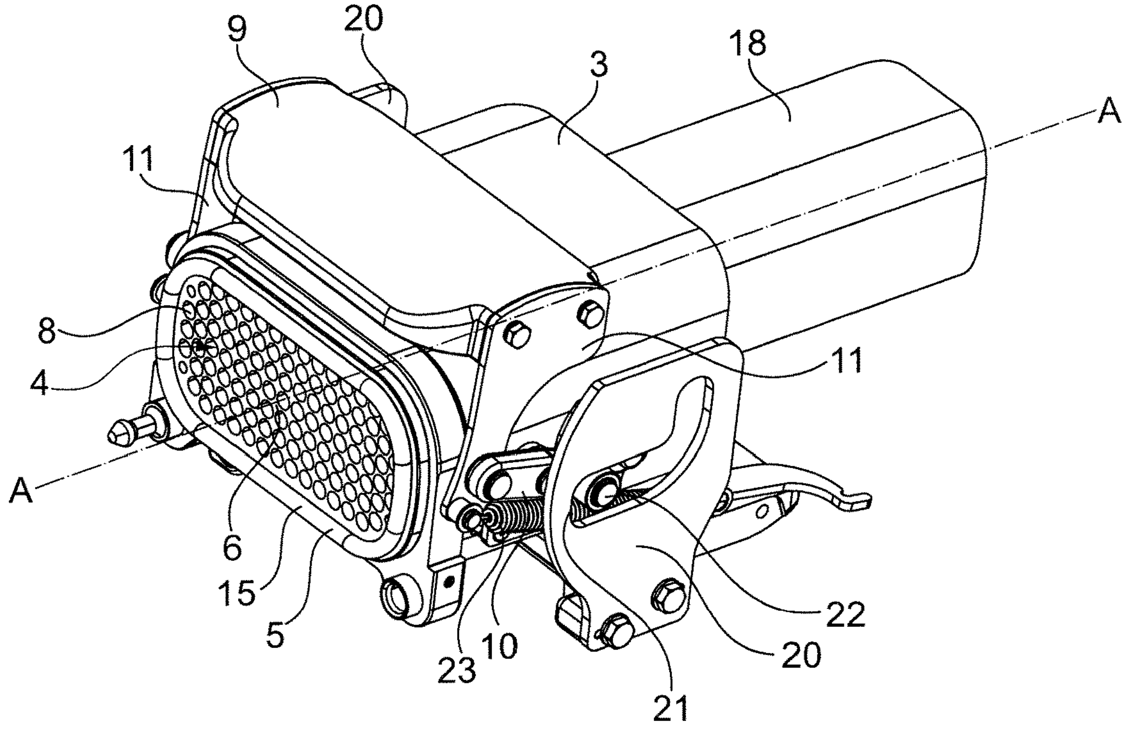
FIG. 11 is a schematic perspective view onto the electrical coupler according to FIG. 2 with the lid in the opened position.

While FIG. 4 shows a close up side view, FIG. 8 shows the electric coupler in the same operating position, but in a perspective view. While FIG. 5 shows a close up side view, FIG. 9 shows the electric coupler in the same operating position, but in a perspective view. While FIG. 6 shows a close up side view, FIG. 10 shows the electric coupler in the same operating position, but in a perspective view. While FIG. 7 shows a close up side view, FIG. 11 shows the electric coupler in the same operating position, but in a perspective view.

FIGS. 2, 4, 8 show the lid 9 in the closed position, in which the lid 9 is arranged in front of the endface 7 of the insulation block 6. To initiate the opening of the lid the housing 3 is pushed forward by the piston of the hydraulic cylinder 18. As can be seen when comparing FIG. 4 and FIG. 5, the roller 22 is on the left side of a vertical line through the rotational axis D, when the lid 9 is in the closed position. As the housing 3 is moved forward (towards the left in the FIGS. 3 to 11) the roller 22 crosses to the right side of a vertical line through the rotational axis D (see FIG. 5, FIG. 9). This first part of the opening movement of the lid 9 in an advantageous manner leads to the lid 9 being lift off the lid contact surface 13 that is arranged on the sealing 15 almost in a linear manner, namely horizontally towards the left in the FIGS. 3 to 11. This almost linear movement of the lid 9 away from the sealing 50 prevents the sealing 15 from being squeezed unevenly and hence reduces possible damages to the sealing 15.

The movement of the roller 22 from the position in FIG. 4 to the position in FIG. 5 is controlled by the stationary guide rail 21 of the plates 20. Pushing the housing 3 forward (towards the left in the FIGS. 3 to 11) leads for the rotational axis D also to be moved towards the left. Given that the plates 20 and the stationary guide rail 21 arranged in these plates 20 form part of the support frame 16 and remain stationary as the housing 3 is moved relative to the support frame, the movement of the housing 3 leads for the roller 22 to abut against a rightward facing surface of the stationary guide rail 21. Further movement of the housing 3 forward (towards the left) leads to the roller 22 moving from the position shown in FIG. 4 (left side of a vertical line through the rotational axis D) to the position shown in FIG. 5 (right side of a perpendicular line through the rotational axis D. As the housing 3 is moved further forward (towards the left in the FIGS. 3 to 11) the rotational axis D) is also moved forward (towards the left in FIGS. 3 to 11). The design of the guide rail 21 and the forward movement of the rotational axis D makes the roller 22 take up the positions shown in the FIGS. 6 and 7.

Figure 12:
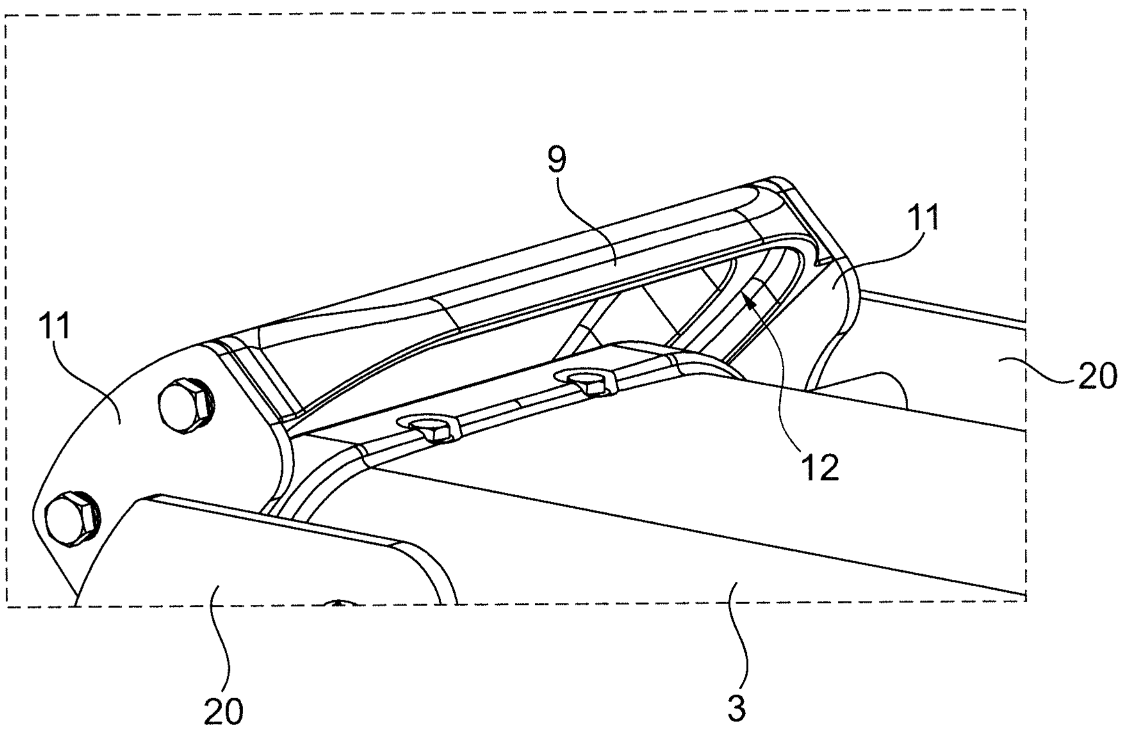
FIG. 12 is a schematic perspective close-up onto the electrical coupler according to FIG. 2 with the lid opened half way.

FIG. 12 shows a view of the lid 9 in a similar position as shown in FIG. 10 and FIG. 6. The perspective view shown in FIG. 12 allows to identify the housing contact surface 12 that is arranged on the inside of the lid 9 and is intended to contact the lid contact surface 13, which is the forward side of the sealing 15.

Figure 13:
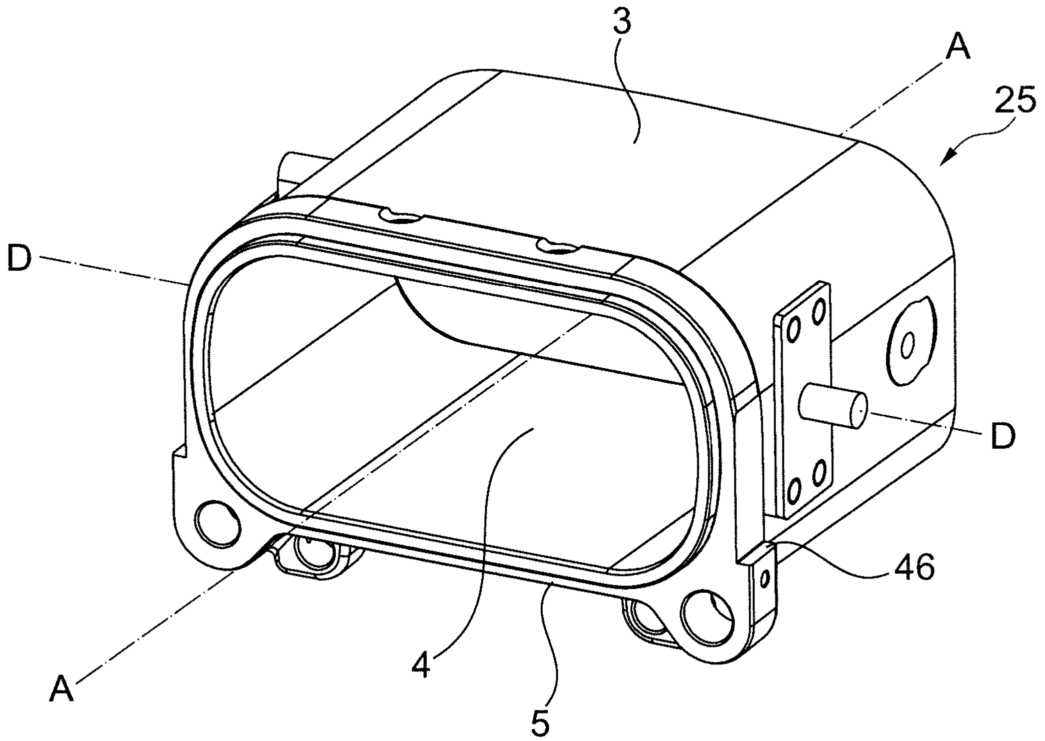
FIG. 13 is a schematic perspective view onto the housing of the electrical coupler according to FIG. 2.

FIG. 13 shows a perspective view of the housing 3. The view of FIG. 13 does not show the sealing 15, which forms part of the rim 5, when built in, and that forms the lid contact surface 13. FIG. 13 also shows that the housing 3 has an entry opening 25 that is arranged opposite the end opening 4. The insulation block 6 can be inserted into the housing 3 through the entry opening 25. The back piece 26 is provided that closes the entry opening 25.

Figure 14:
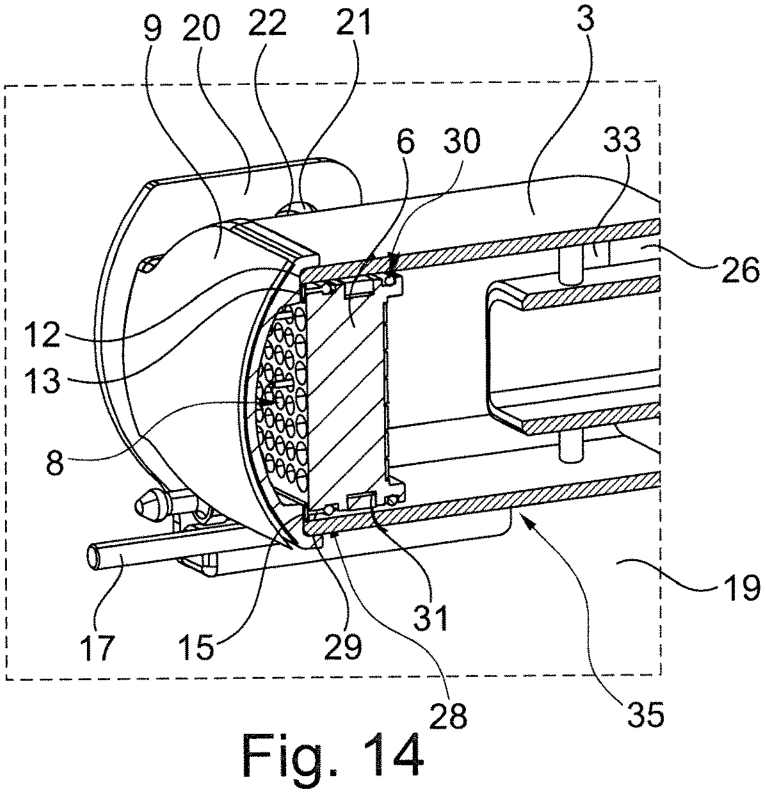
FIG. 14 is a schematic sectional, perspective view onto the electrical coupler according to FIG. 2 with the lid in the closed position.
Figure 15:
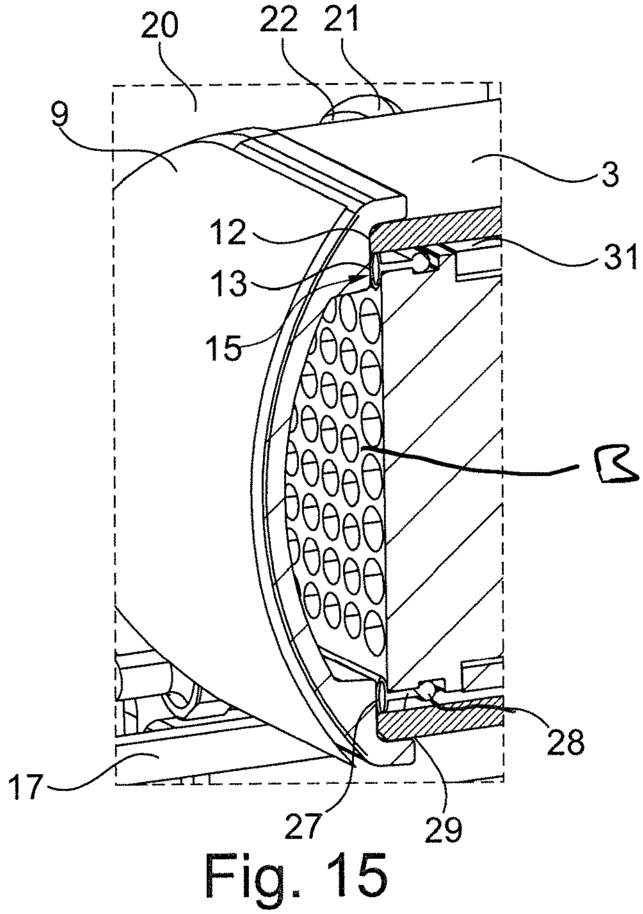
FIG. 15 is a close-up of a detail of FIG. 14.

FIGS. 14 and 15 show sectional views of the electrical coupler 2. The view chosen for FIG. 14 and FIG. 15 show the seal 15 within the lid 9. This view is chosen to indicate, that the sealing 15 is compressed.

Figure 16:
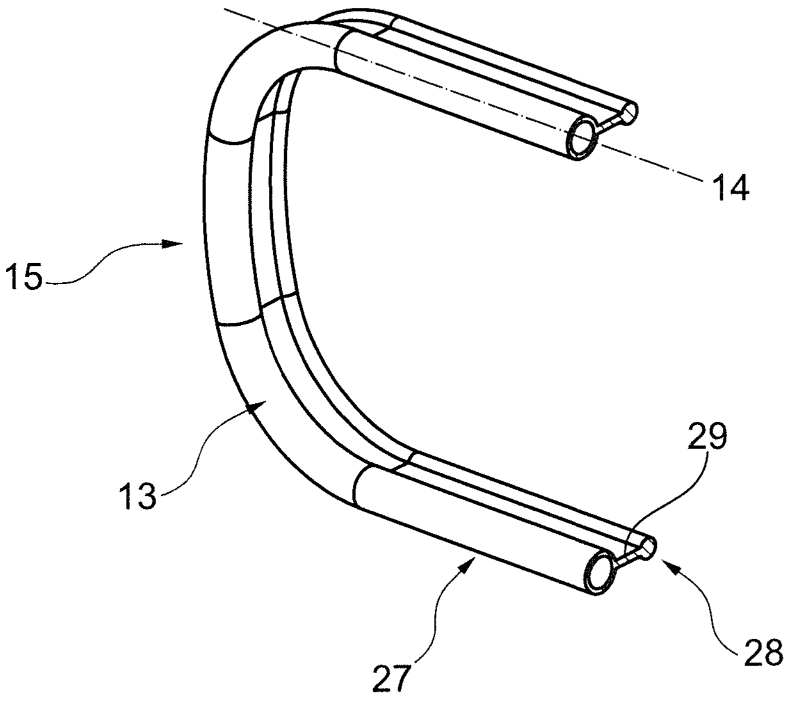
FIG. 16 is a schematic sectional, perspective view of a sealing that can be used with the electrical coupler of FIG. 2.
Figure 17:
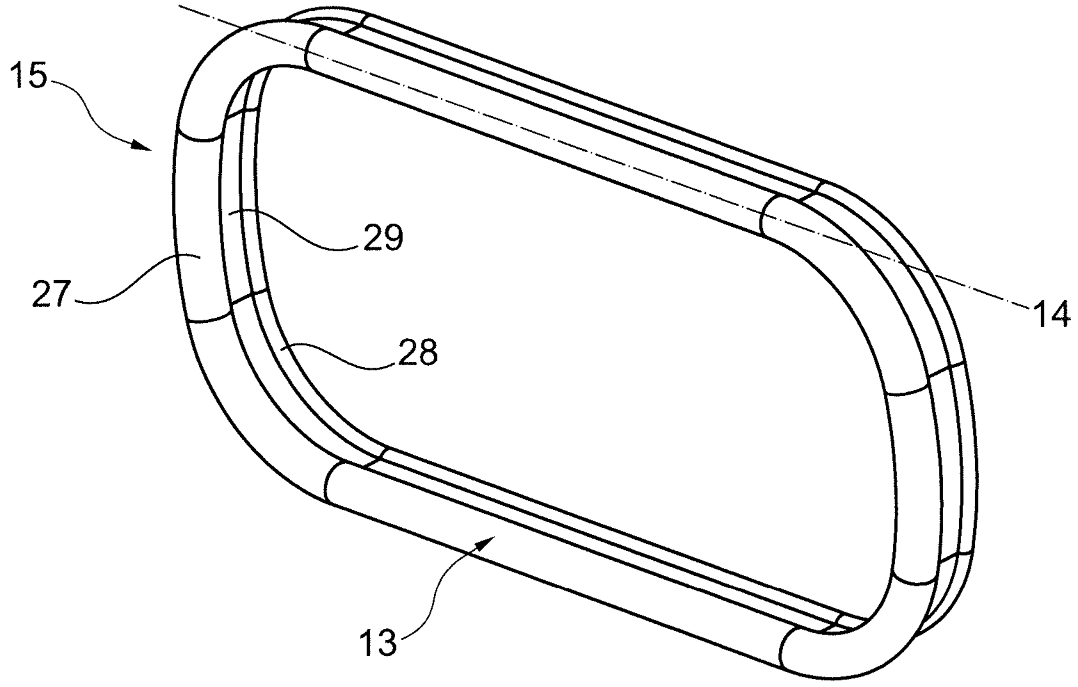
FIG. 17 is a schematic perspective view of the sealing according to FIG. 15.

FIGS. 16 and 17 show the sealing 15. The sealing 15 is a double sealing. The sealing 15 has a first bulge 27 and a second bulge 28. The bulge 27 and the bulge 28 are interconnected by a wall 29. The bulge 27 forms part of the rim 5. Due to its ring shape the bulge 27 in cooperation with the lid 9 is intended to stop liquids from reaching the endface 7 of the insulation block 6 when the lid is in the closed position. When the lid is in the open position, the bulge 27 is to operate as sealing that interacts with a similar sealing on the electrical coupler of the second car to which the electrical coupler is to coupled. The forward facing surface of the bulge 27 in the embodiment shown here makes up the lid contact surface 13. As can be seen in FIGS. 14 and 15, the forward facing surface of the bulge 27 interacts with the housing contact surface 12 of the lid 9. Also, the reference line 14 is arranged on the forward facing surface of the bulge 27.

The bulge 28 serves as seal that seals the insulation block 6 against the inner circumferential surface of the housing 3.

The particular design of the sealing 15 has advantages in the assembly of the electrical coupler 2. The sealing 15 can be placed on the insulation block 6 as the insulation block is still outside the housing 3. The insulation block 6 is then introduced through the entry opening 25 into the housing 3. Bulge 27 will be pushed slightly inwards in order to allow the insulation block with the sealing 15 sitting on it to be introduced through the entry opening 25. As the insulation block reaches its position shown in FIGS. 14 and 15, the bulge 27 will expand back into its normal position as shown in the FIGS. 14, 15, 16 and 17.

Insulation block 6 has an additional, rearward sealing 13 as can be seen in FIG. 14.

As can be seen in FIGS. 14 and 15, a ring shaped frame 31 is provided in a recess of the insulation block 6. Screws 32 that reach through the wall of the housing and with their heads rest against the outside of the housing and which can be sealed against the outside of the housing can be used to engage with appropriate threaded holes in the frame 31 to fix the insulation blocks 6 in the position shown in FIGS. 14 and 15. Likewise the back piece 26 has a similar frame 33 that is set into an appropriate recess in the back piece 26. Screws 34 are used to fix the frame 33 and with the frame 33 the back piece 26 in the position shown in FIG. 14. The back piece 26 is also provided with a sealing 35.

Figure 18:
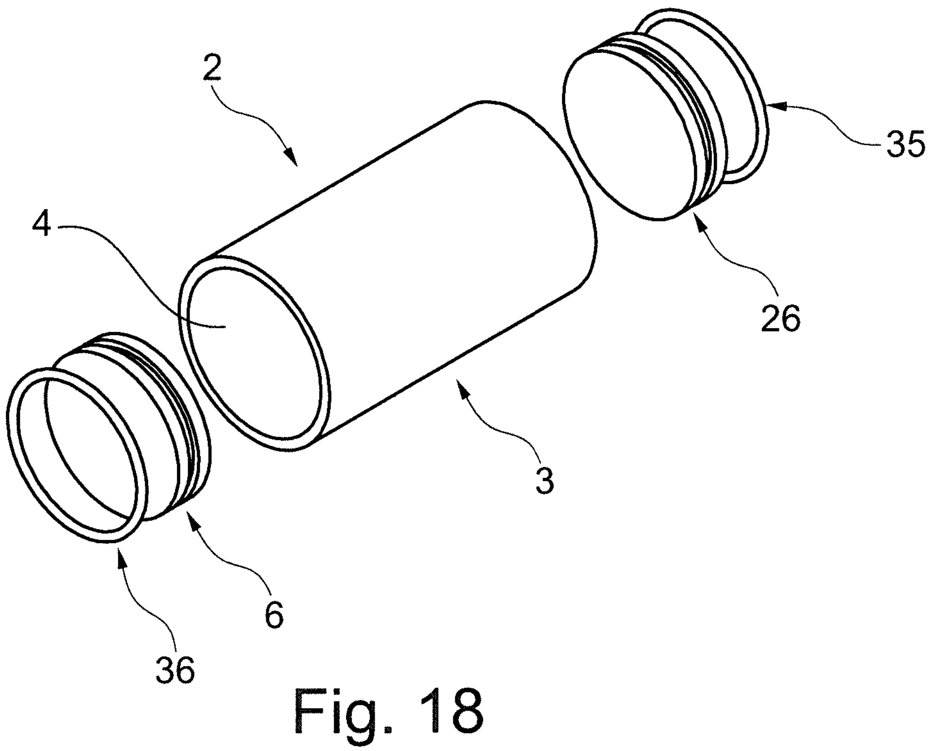
FIG. 18 is a schematic perspective, exploded view of a further embodiment of the electrical coupler according to the invention.
Figure 19:
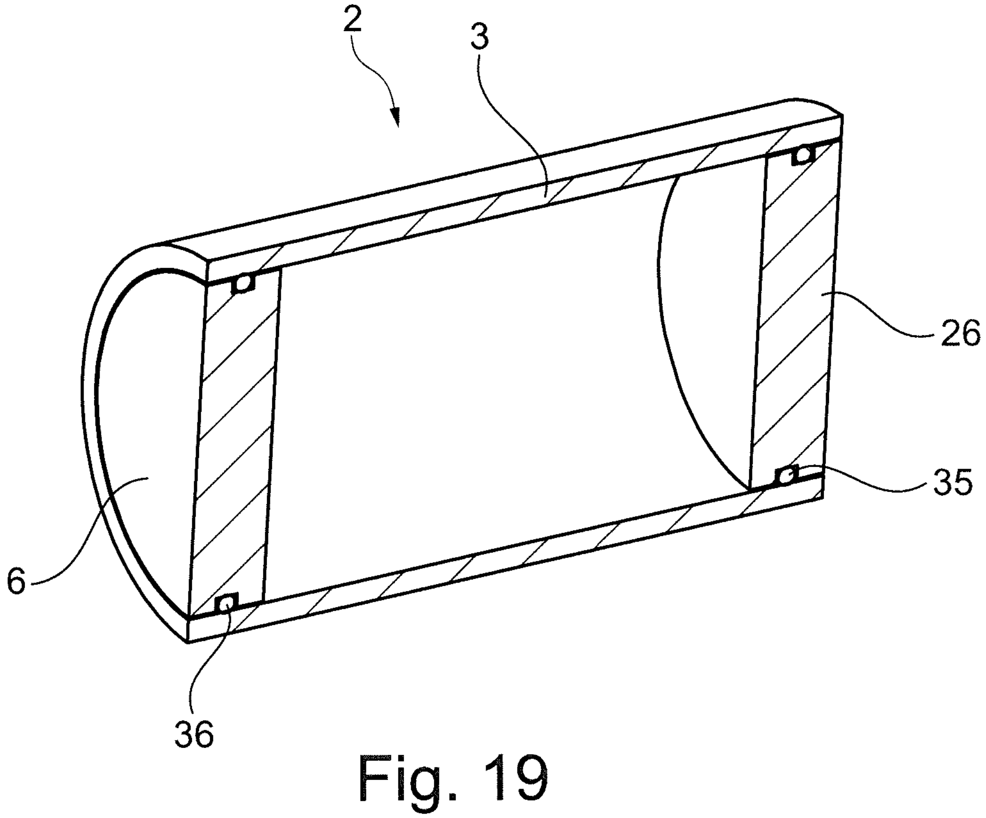
FIG. 19 is a schematic sectional view of the electrical coupler according to FIG. 18.

The FIGS. 18 and 19 show a different possible geometric design of the housing 3. While in the embodiment shown in FIG. 13 the housing 3 has a box-shaped design, the housing 3 of the FIGS. 18 and 19 is of cylindrical design. In this design instead of the dual sealing 15 with its bulge 28 for the insulation block 6 an individual ceiling 36 is provided that seals the outer circumferential surface of the insulation block 6 against the inner circumferential surface of the housing 3. The back piece 26 is provided with the sealing 35.

Figure 20:
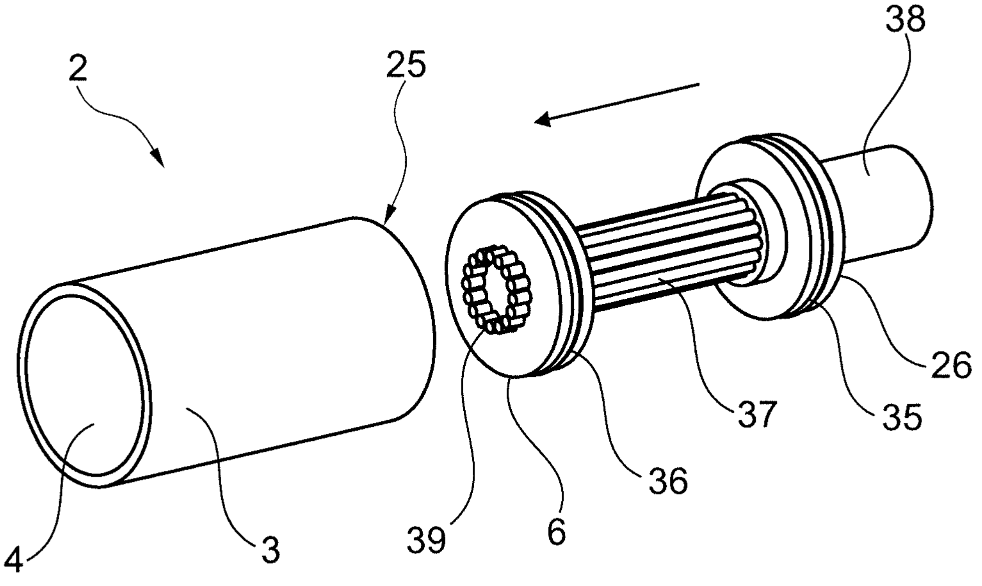
FIG. 20 is a schematic perspective, exploded view of the embodiment of FIG. 18 with a cable strand attached to it.
Figure 21:
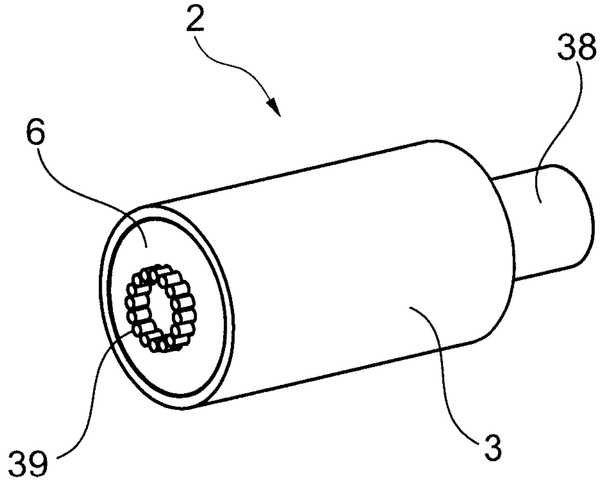
FIG. 21 is a schematic sectional view of the electrical coupler according to FIG. 20.

FIG. 20 and FIG. 21 using the embodiment shown in FIGS. 18 and 19 show an advantageous method for assembling the electrical coupler.

According to a preferred method for assembling the electrical coupler 2 cables 37 that reach the electrical coupler by way of a cable strand 38 are fed through an appropriate opening in the back piece 26. The appropriate opening in the back piece 26 is sealed against the cable strand 38. In between the insulation block 6 and the back piece 26 the cables 37 are individualised from the cable strand 38. The ends of the cables 37 are fed through holes 8 in the insulation block 6. The respective part of a male/female connection type is attached to the end of the cable 37 on the outward facing side of the insulation block 6.

FIG. 20, 21 show a ring of male connectors 39 protruding from the insulation block 6. Once the ends of the cables have been fed through the holes 8 of the insulation block 6 and attached to the male connectors 39, the position of the ends of the cables 37 within the insulation block 6 is fixed. Given that this work has been performed while the insulation block 6 and the end piece 26 are outside the housing, the worker can check, whether the connections are all properly made. After this work has been performed, the worker inserts the insulation block 6 through the entry opening 25 and pushes the insulation block 6 to be situated in the end opening 4 and closes the entry opening 25 with the back piece 26. Fixing the insulation block 6 and the back piece 26 to the housing 3 can be done by way of the frames 31, 33 and the screws 32, 34 described above.

Figure 22:
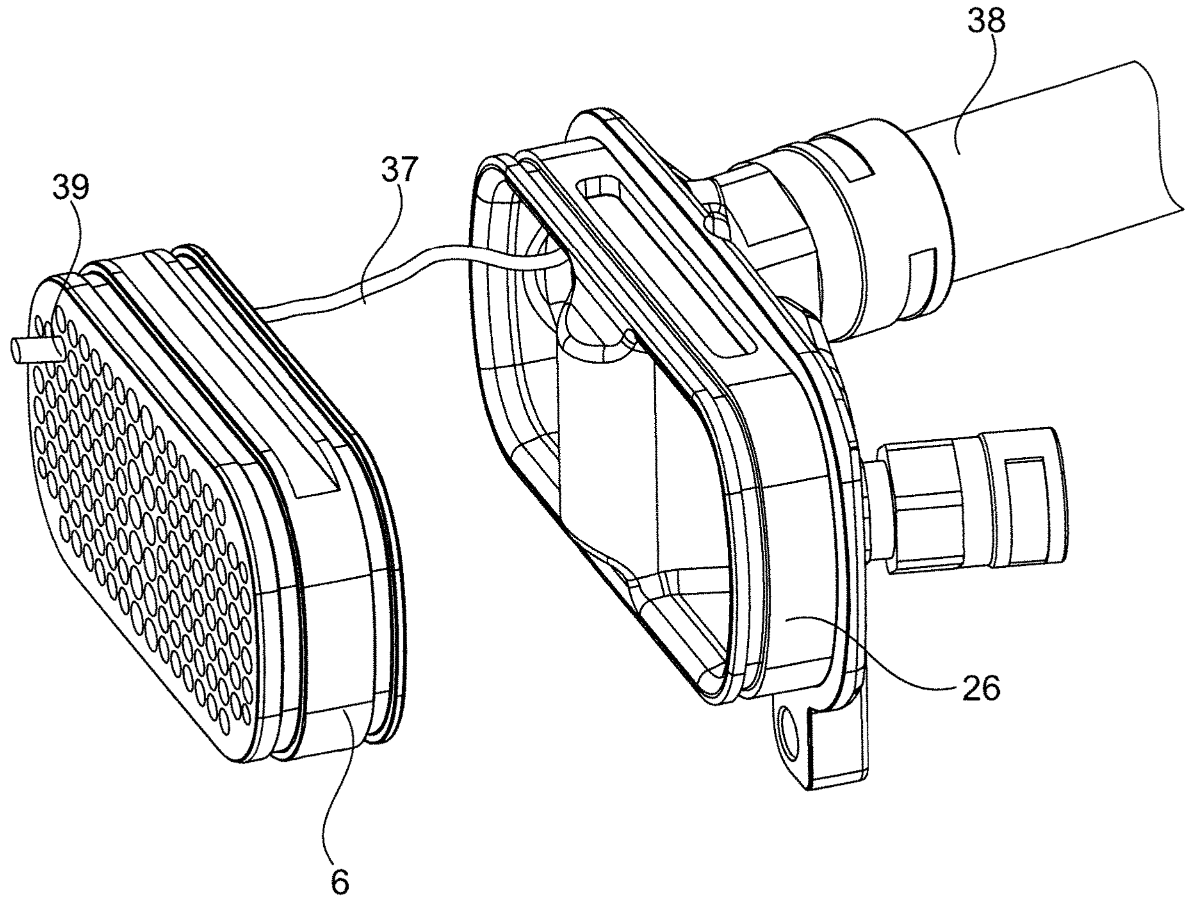
FIG. 22 is a schematic perspective view of an insulation block and a back piece and a cable for an electrical coupler according to FIG. 2
Figure 23:
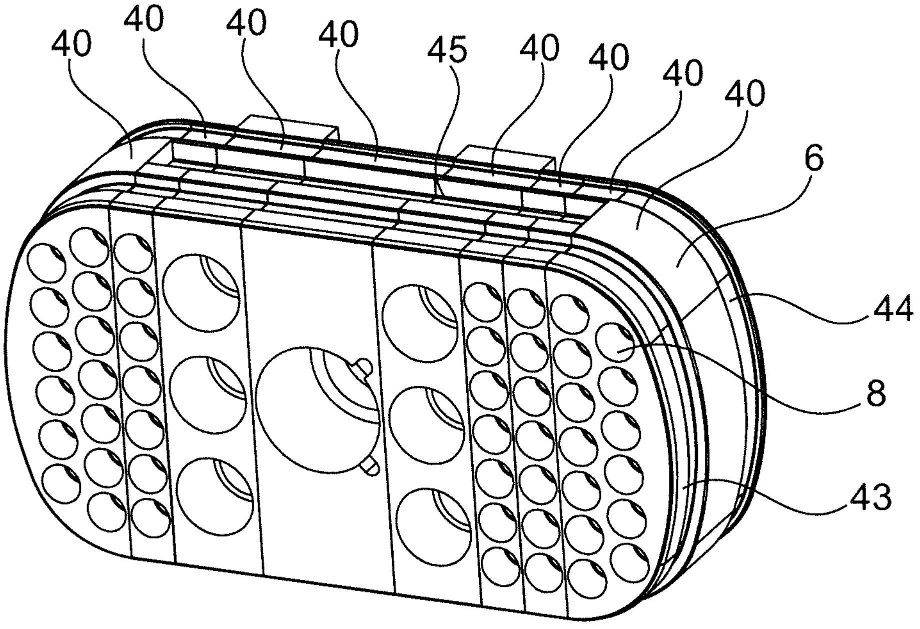
FIG. 23 is a schematic perspective view of an insulation block for an electrical coupler according to FIG. 2.
Figures 24, 25, 26, 27:
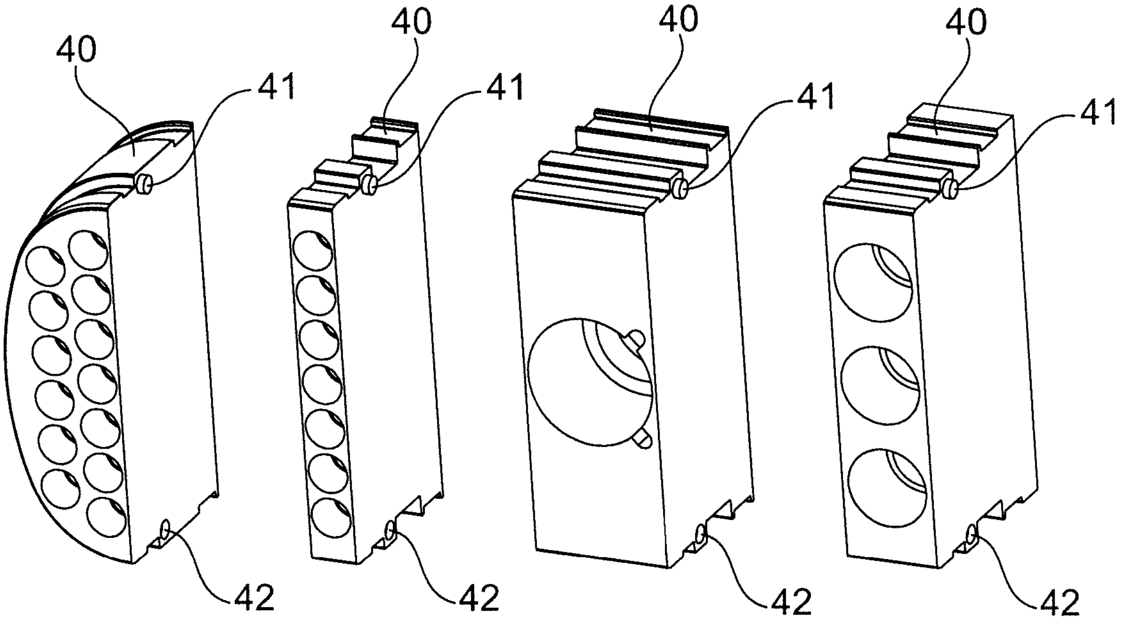
FIGS. 24 to 27 are schematic perspective views of sub-blocks that can be put together to make up the insulation block of FIG. 23.

FIG. 22 shows that the same method can be performed with the differently shaped embodiment of the housing 3 as is shown for example in FIG. 13.

FIGS. 23 to 27 show that the insulation block 6 can be made up of several sub-blocks 40. The use of sub blocks 40 allows the insulation block 6 to be individually designed for the types of cables 37 that are to be connected with the respective electrical coupler 2. The individual sub-block 40 can have protrusions 31 and recesses 42. The respective protrusion 41 protrudes into a respective recess 42 in a neighbouring sub-block 40. This stabilises the arrangement of the sub blocks 40 next to each other. As can be seen from FIG. 23, the insulation block has a ring shaped recess 43 that is intended to take up the bulge 28 of the sealing 15. The insulation block 6 also has a ring shaped recess 44 that is intended to take up the additional sealing 30. An additional recess 45 can be used to into engage with the screws 32 and thereby obviate the necessity of a frame 31.

Figure 28:
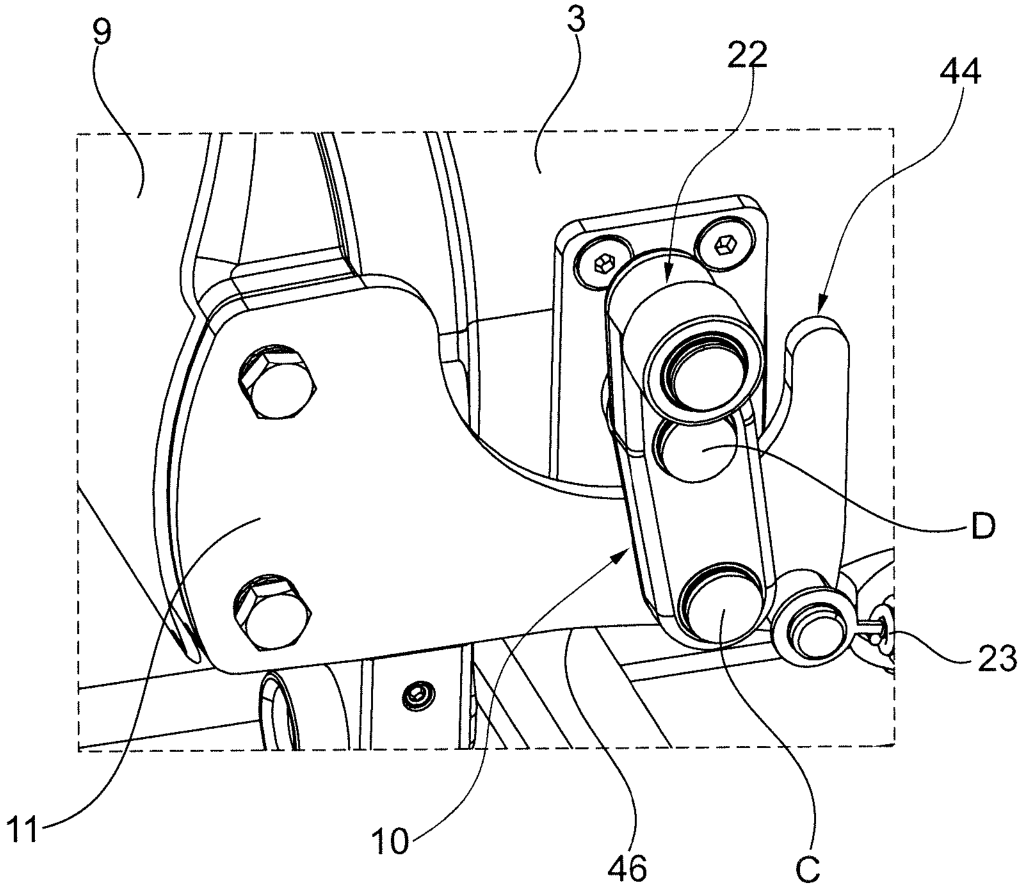
FIG. 28 is a schematic perspective close-up onto a detail of the electric coupler according to FIG. 2.

While FIGS. 4 to 7 show a view, in which the second arm 11 has been drawn as see through, FIG. 28 shows a similar view onto the first arm 10 and the second arm 11 with the second arm 11 being fully drawn. FIG. 28 shows that the second arm 11 has a lever 44.

Figure 29:
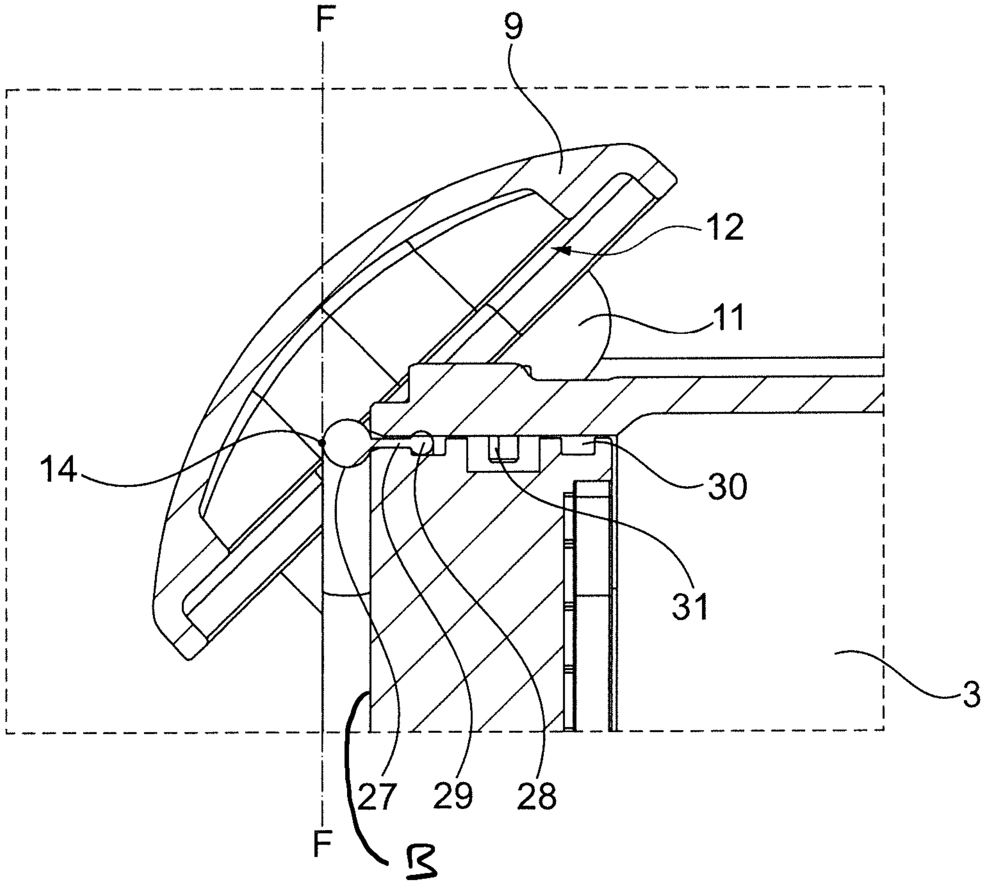
FIG. 29 is a schematic sectional side view onto a detail of the electric coupler according to FIG. 2 with the lid half open.

FIG. 29 shows that a part of the housing contact surface 12 crosses the reference plane F that contains the reference line 14 and runs perpendicular to the base plane E at a point closer to the base plane E (not shown in FIG. 29) then the reference line 14 is as the lid 9 is moved from the closed position to the open position.

Figure 30:
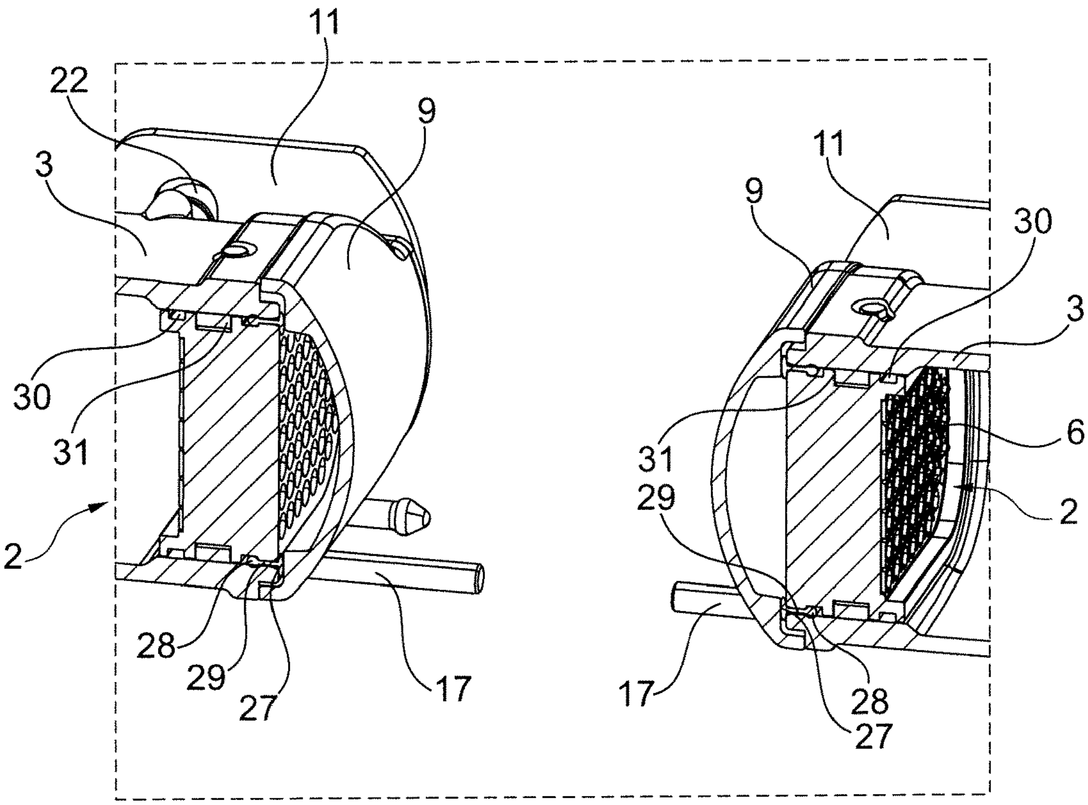
FIG. 30 is a schematic perspective view of the ends of two electrical couplers according to FIG. 2 arranged facing each other with the respective lids in the closed position.
Figure 31:
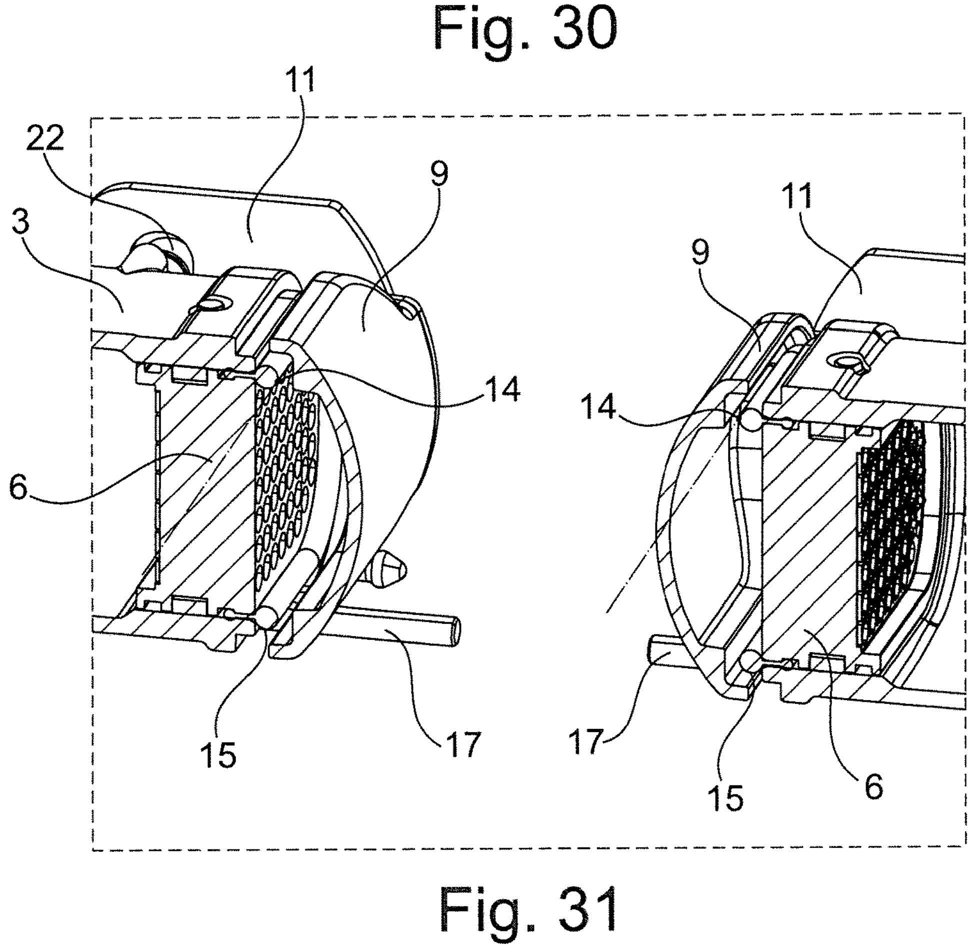
FIG. 31 is a schematic perspective view of the ends of two electrical couplers according to FIG. 2 arranged facing each other with the respective lids slightly opened.
Figure 32:
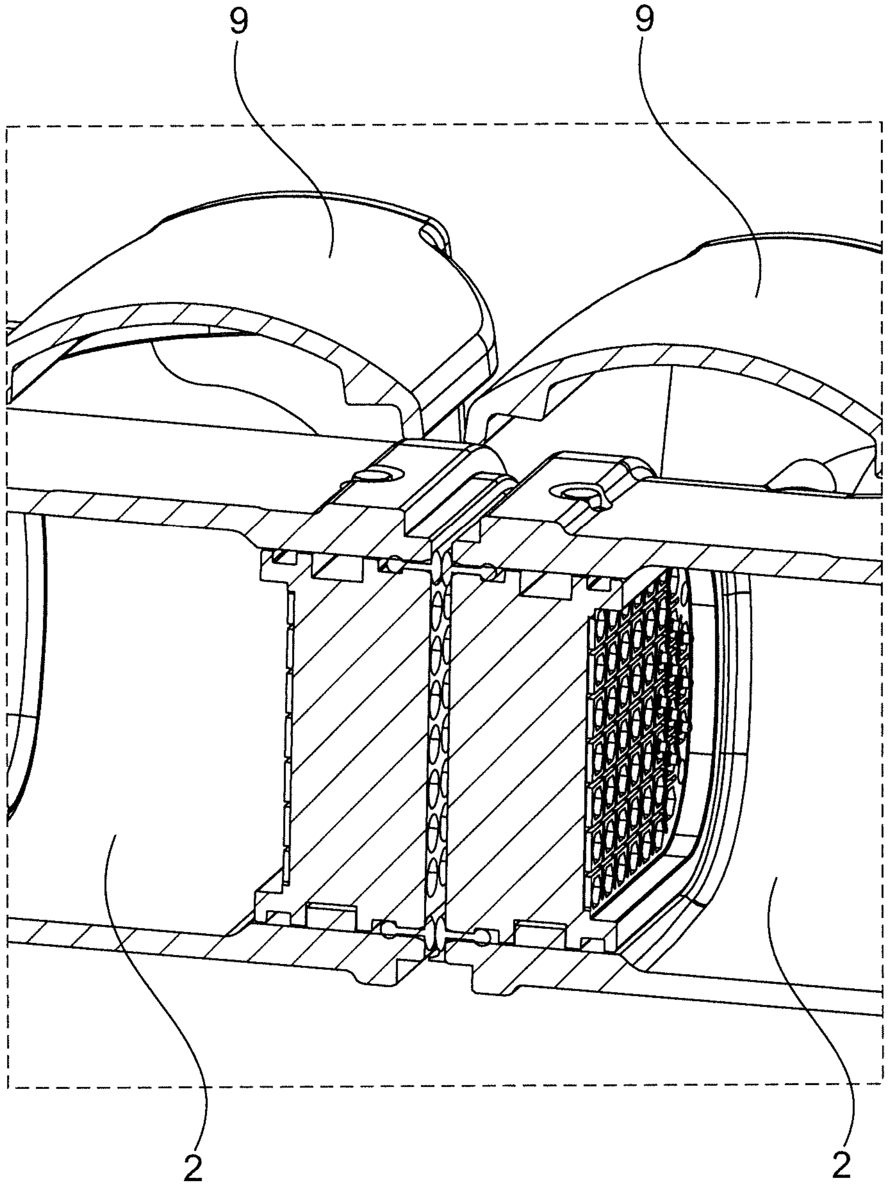
FIG. 32 is a schematic side view onto a first electrical coupler according to the invention being joined with a second electrical coupler according to the invention.

FIG. 30 in FIG. 31 show two electrical couplers 2 according to the invention set next to each other. The situation shown in FIGS. 30, 31 can be reached, when two cars of a train have been brought into proximity to each other. The situation shown in FIGS. 30 and 31 is the situation prior to the two cars of the train being finally pushed together such that the couplers for mechanically coupling the two cars to each other engage with each other. The situation shown in FIGS. 30 and 31 is the situation that prepares the final coupling of the couplers.

FIG. 30 shows the position, wherein the lids 9 of the respective electrical couplers 2 are in the closed position. FIG. 31 shows the situation, where the respective housing 3 of the respective electrical coupler 2 has been pushed closer towards the end of the bars 17 by use of the respective hydraulic cylinder 18 of the respective electrical coupler 2. The situation shown in FIG. 31 is similar to the situation shown in FIG. 5. The respective lids 9 have lift off from the sealing 15. The respective housing contact surfaces 12 of the respective lids 9 have left the contact with the respective lid contact surface 13 of the respective housing 3.

Figure 33:
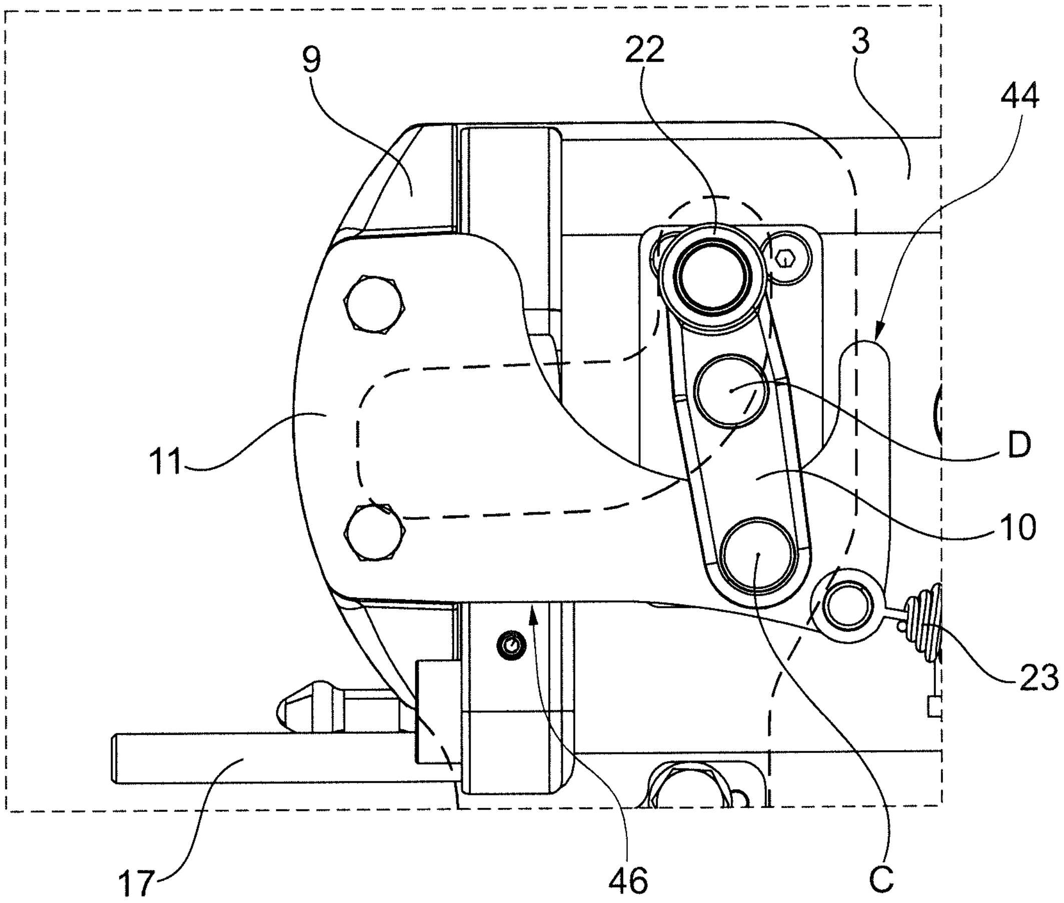
FIG. 33 is a schematic side view onto a detail of the electrical coupler according to FIG. 2 with the lid in the closed position.
Figure 34:
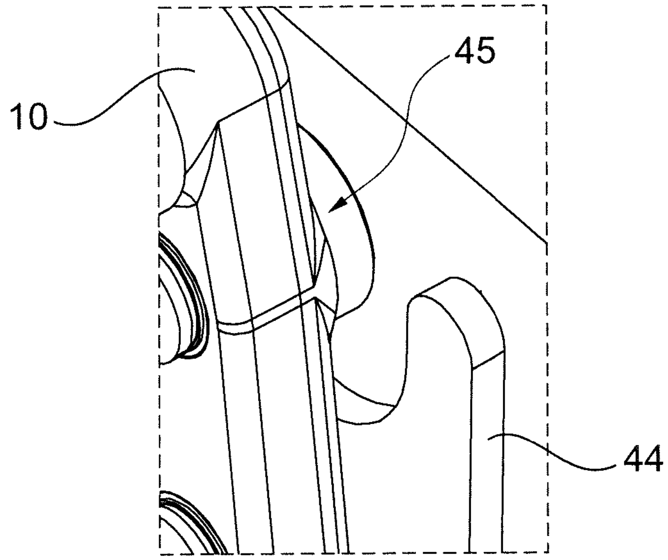
FIG. 34 is a schematic perspective view onto a detail of the electrical coupler according to FIG. 2.

FIGS. 33 to 38 show the initial movement of the lid 9 from the closed position towards the open position. FIGS. 33 and 34 show the positioning of the lid 9 similar to the position shown in FIG. 4, 8 and hence the closed position of the lid 9. FIG. 34 highlights that the lever 44 of the second arm 11 is distanced from an outer circumferential surface 45 that belongs to the main axis that defines the rotational axis D. To reach the position shown in FIGS. 35, 36 the housing has been moved forward (towards the left in the FIG. 33, 35, 37). As described in relation to FIGS. 4 and 5, this initial forward movement of the housing 3 makes the roller 22 cross a vertical line that crosses the rotational axis D from a position towards the left of this vertical line to a position towards the right of this vertical line. This movement makes the rotational axis C move towards the left and makes the second arm 11 move towards the left. This movement towards the left makes the lever 44 of the second arm 11 come into contact with the outer circumferential surface 45. The contact of the lever 44 with the outer circumferential surface 45 limits the amount that the second arm 11 can move forward. The contact between the lever 44 and the outer circumferential surface 45 ends the phase of predominantly horizontal movement of the lid 9 and starts a phase of predominantly vertical movement of the lid (vertical and backward movement of the lead 9).

Figure 35:
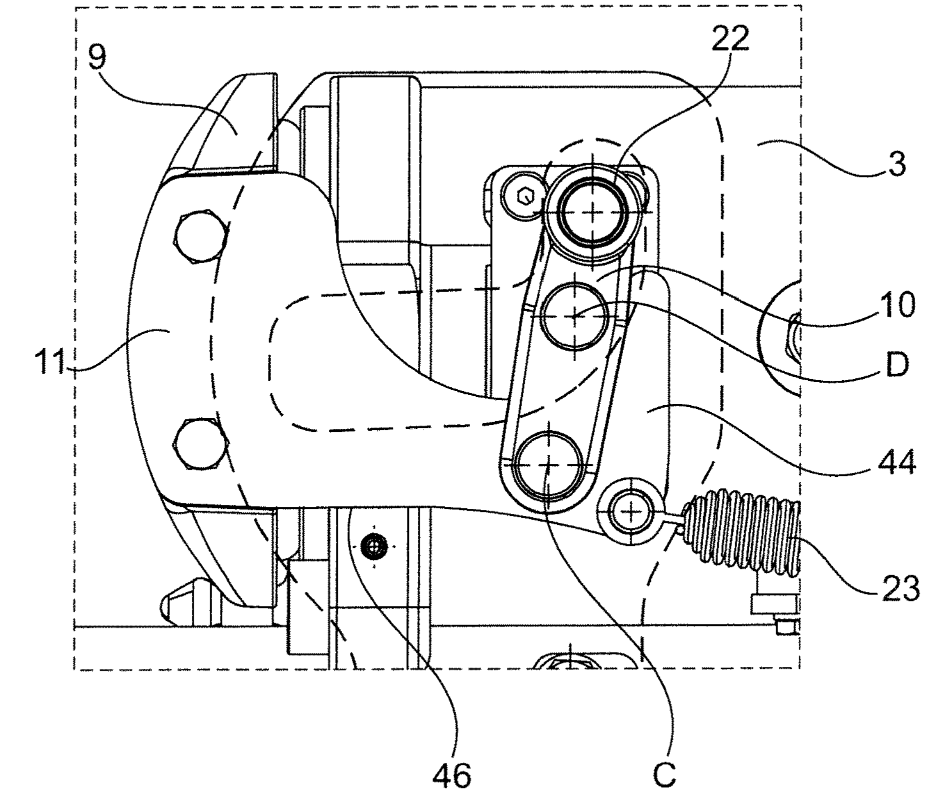
FIG. 35 is a schematic side view onto a detail of the electrical coupler according to FIG. 2 with the lid slightly opened.
Figure 36:
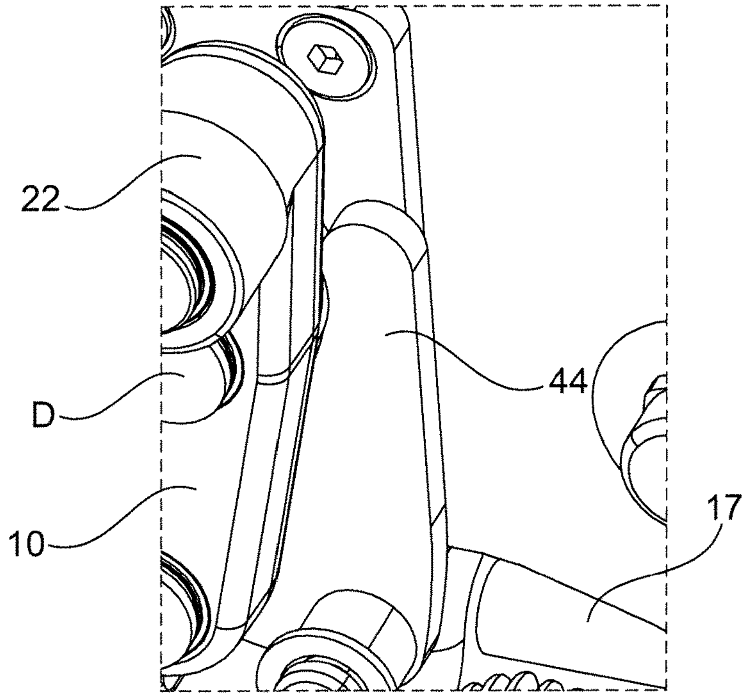
FIG. 36 is a schematic perspective view onto a detail of the electrical coupler according to FIG. 2.
Figure 37:
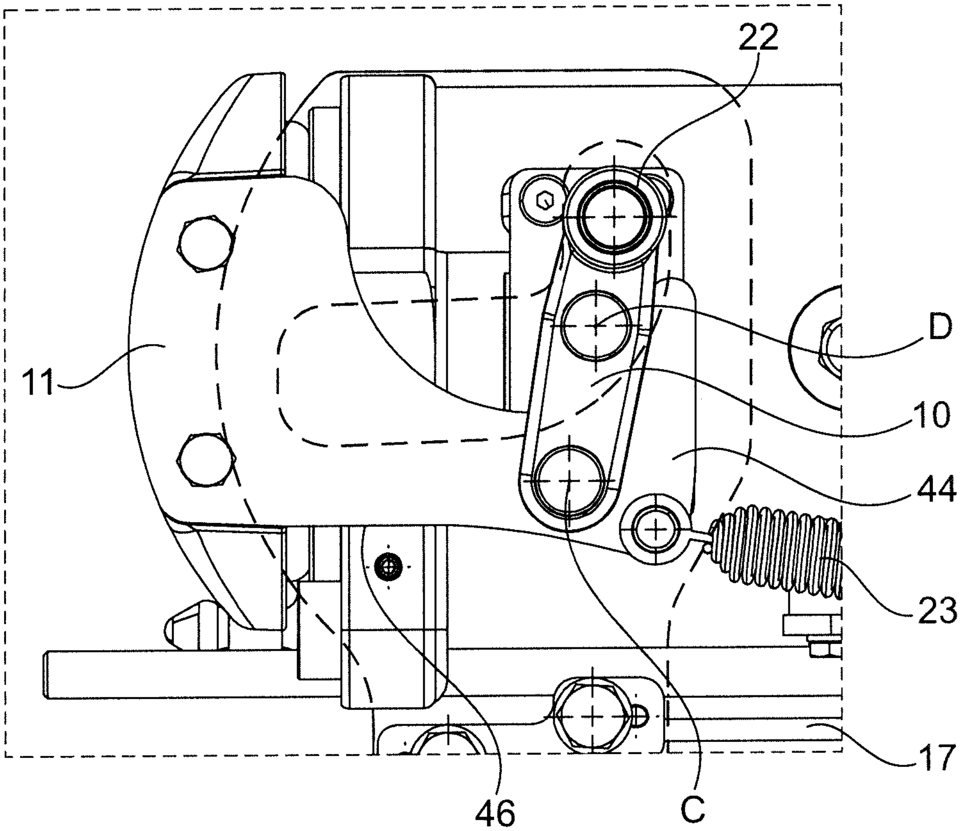
FIG. 37 is a schematic side view onto a detail of the electrical coupler according to FIG. 2 with the lid further opened in comparison to the position of the lid in FIG. 35.
Figure 38:
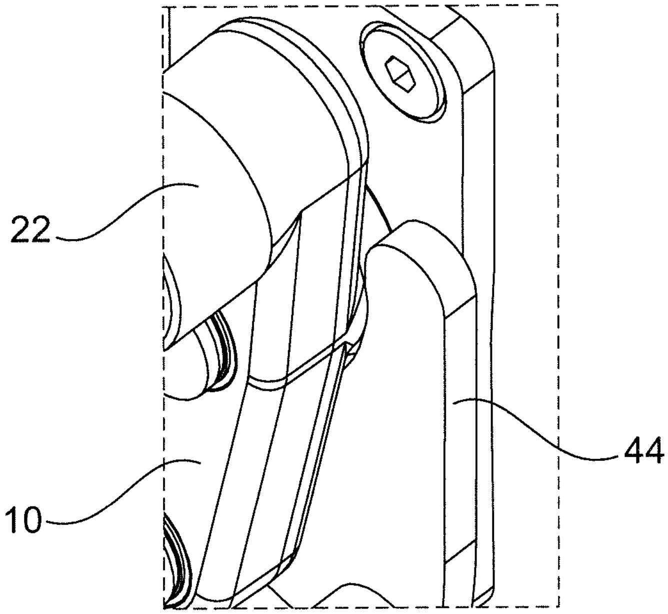
FIG. 38 is a schematic perspective view onto a detail of the electrical coupler according to FIG. 2.

As highlighted in FIGS. 33, 35 and 37, the housing 3 has a horizontal guiding surface 46. In the closed position of the lid 9, the second arm 11 rests on the horizontal guiding surface 46. Also, the movement of the leaver 11 from the position shown in FIG. 33 to the position shown in FIG. 35 keeps the lever 11 in contact with the horizontal guiding surface 46. The limitation of the horizontal movement of the second arm 11, which is achieved by the contact of the lever 44 with the outer circumferential surface 45, leads to the second arm 11 leaving the horizontal guiding surface 46 as the forward (leftward) movement of the housing continues. FIG. 37 shows the horizontal guiding surface 46 free and without contact to the second lever 11.

The spring 23 pretensions the second arm 11 for counter clockwise movement around the rotational axis C and for counter clockwise movement around the rotational axis D. In the placements of the second arm 11 as shown in FIGS. 33 and 35, the horizontal guiding surface 46 prevents the second arm 11 from rotating in a counter clockwise direction around the rotational axis C or around the rotational axis D.

Figure 39:
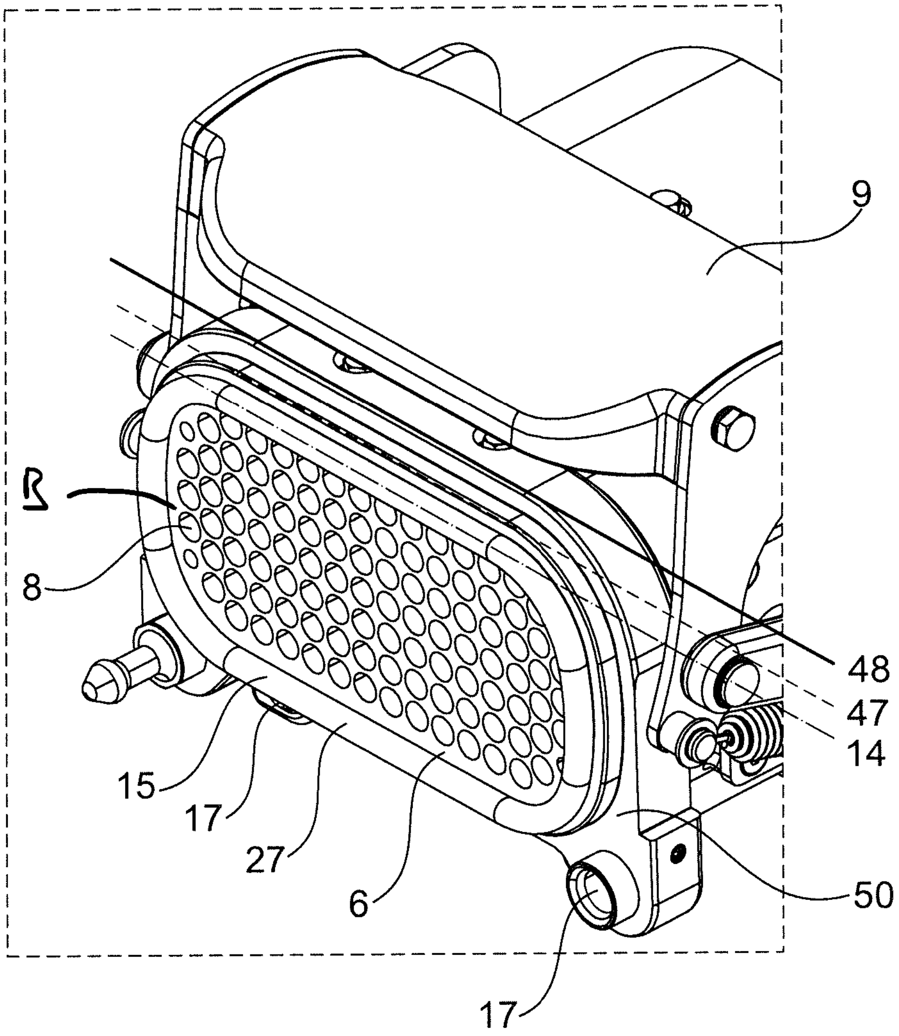
FIG. 39 is a schematic perspective view of the electrical coupler of FIG. 2 in a close-up with the lid in the open position.
Figure 40:
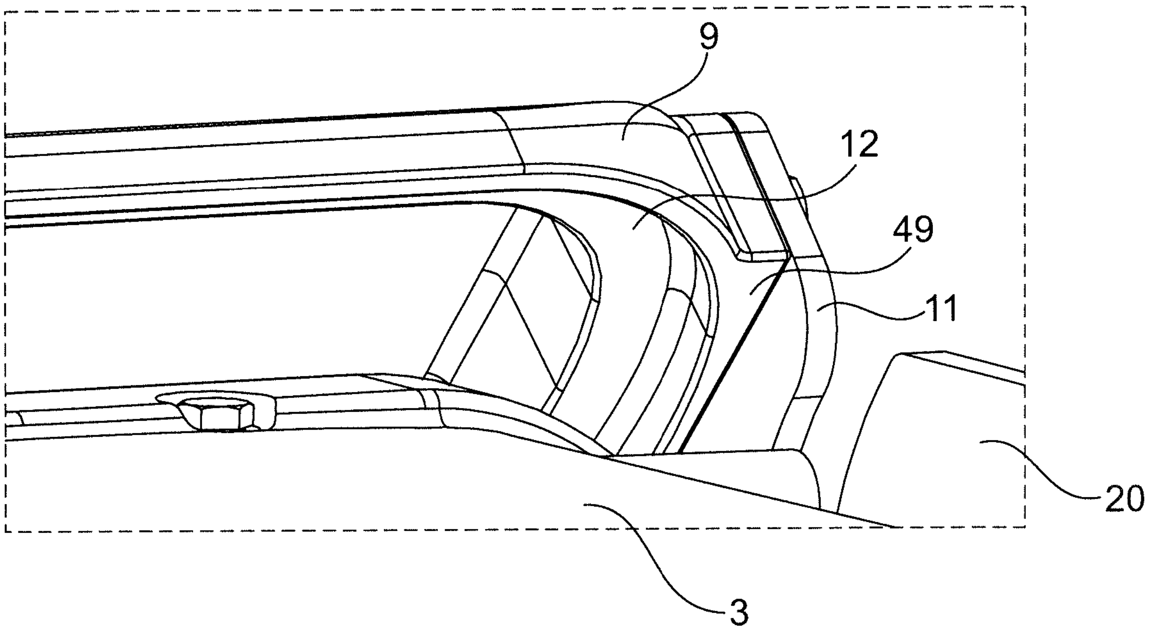
FIG. 40 is a schematic perspective close-up onto the electrical coupler according to FIG. 2 with the lid opened half way.

FIG. 39 is used to show that depending on the individual design, an electrical coupler 2 according to the invention can have several reference lines. FIG. 39 shows the reference lines 14, 47 and 48. The design shown in FIG. 39 with three reference lines 14, 47, 48 hence also has three parallel reference planes F (not shown in FIG. 39). The first reference plane would contain the reference line 14 and run perpendicular to the base plane. The second reference plane would contain the second reference line 47 and run perpendicular to the base plane E. The third reference plane F would contain the reference line 48 and run perpendicular to the base plane E. FIG. 40 shows that the lid 9 has a housing contact surface 12 that is intended to engage with the lid contact surface 13 is provided by the outward facing surface of the bulge 27 of the sealing 15. The lid 9 does contain a further housing contact surface 49, however. This housing contact surface 49 is intended to come into contact with the further lid contact surface 50 provided on the housing 3.

Figure 41:
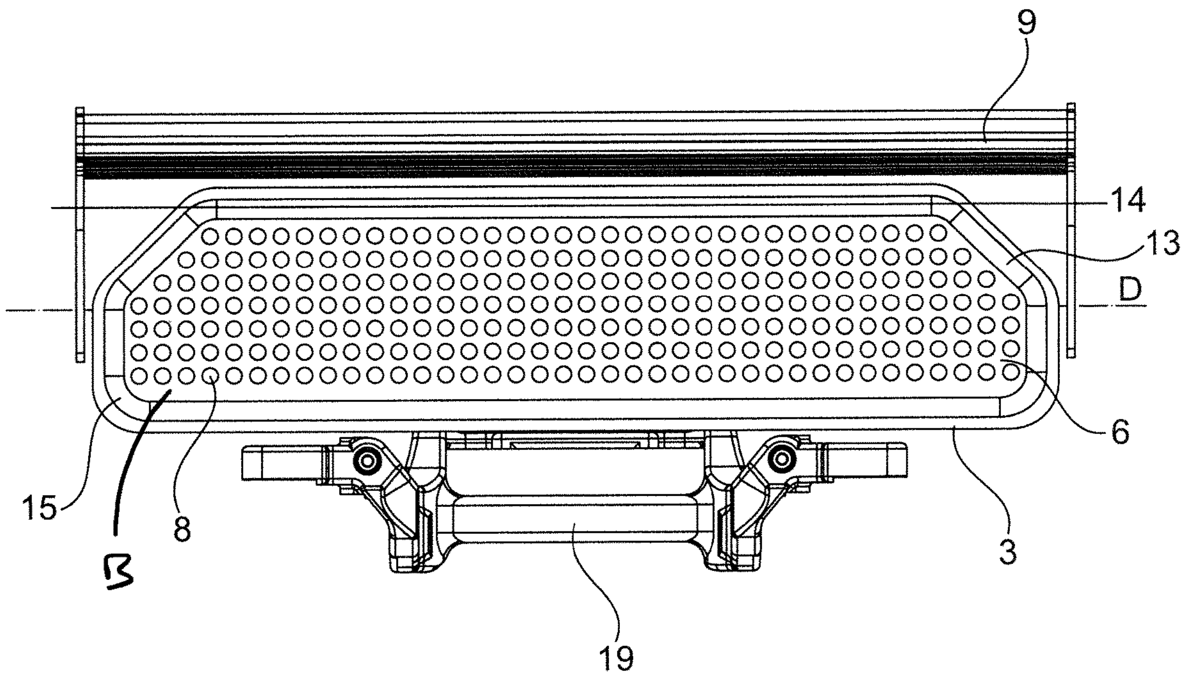
FIG. 41 is a schematic front view onto a further embodiment of the electrical coupler with the lid in the open position.

FIG. 41 show a further possible design of the housing 3 and the insulation block 6. In the embodiment shown in FIG. 1 the lid rotates around the rotational axis D. FIG. 41 symbolises that the ring shaped lid contact surface 13 as provided by the foremost surface of the sealing 15 has two longitudinal surface sections that are arranged in parallel to each other, namely a top longitudinal surface section and a bottom longitudinal surface section whereby a first end of one of the two longitudinal surface sections is connected to a first end of the other of the two longitudinal surface sections by a first side surface section and a second end of the one of the two longitudinal surface sections is connected to a second end of the other of the two longitudinal surface sections by a second side surface section to form the ring shaped lid contact surface and the first side surface section has a section that is a longitudinal surface section and the second side surface section has a section that is a longitudinal surface section the longitudinal surface section of the first side surface and the longitudinal surface section of the second side surface are arranged below the maximum-width plane (which at the same time is the base plane E). In the embodiment shown in FIG. 41 the point of the lid contact surface 13 that is furthest away from the base plane E in one direction is part of a longitudinal section of the lid contact surface 13, namely part of the top longitudinal surface section that runs parallel do the base plane E. The sections of the lid contact surface that are arranged between the maximum-width plane and the reference line converge towards the ends of the longitudinal section of the lid contact surface 13.

Figure 42:
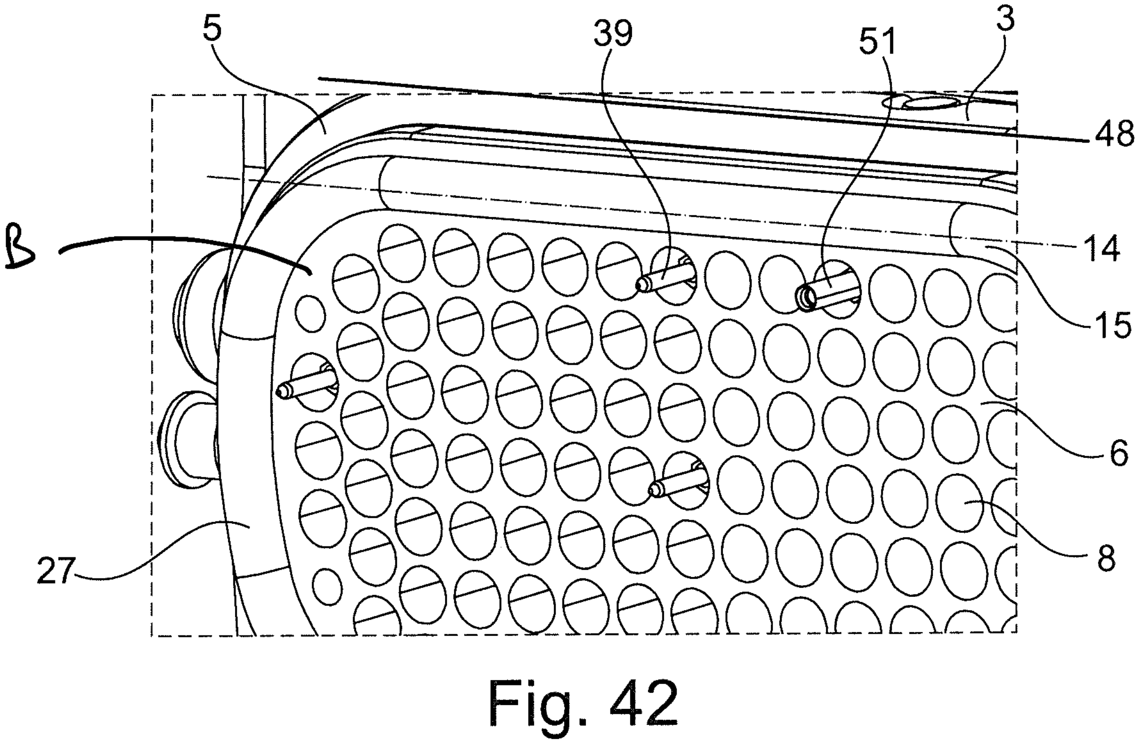
FIG. 42 is a schematic perspective close up onto the electrical coupler according to FIG. 2 with the male type and female type connections of the end of the cable protruding from the endface of the insulation block and FIG. 43 is a schematic perspective cut-view onto the electrical coupler according to FIG. 2 with the male type and female type connections of the end of the cable protruding from the endface of the insulation block.
Figure 43:
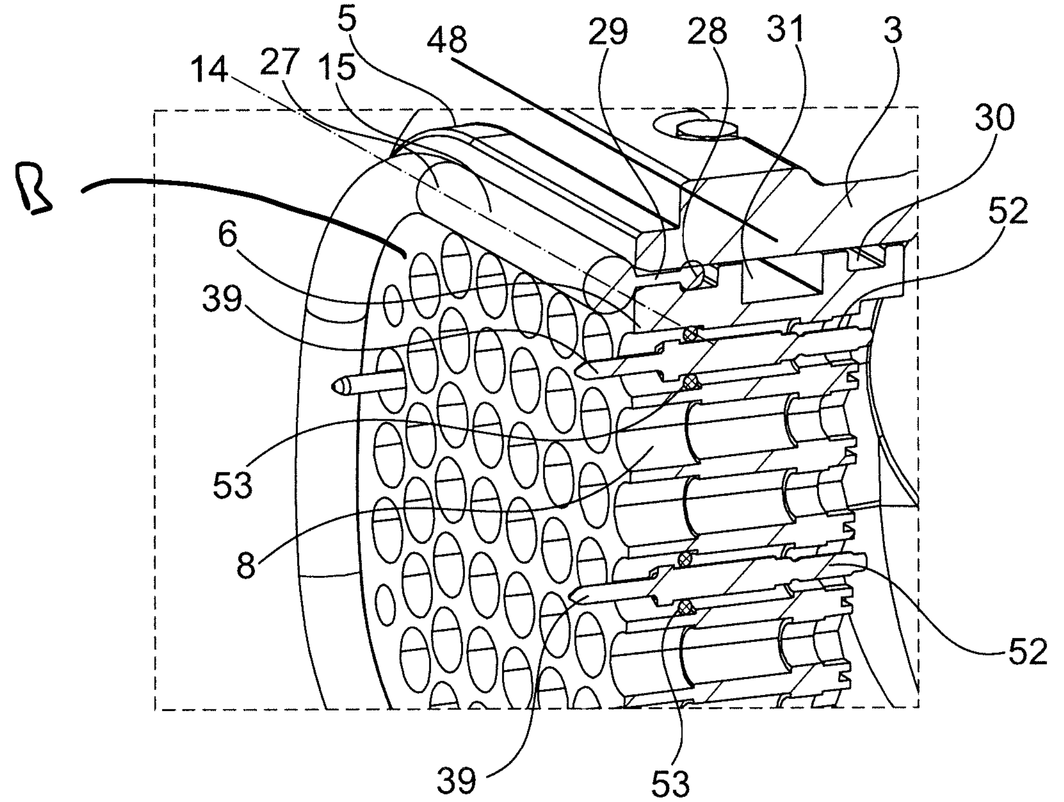

FIG. 42 in FIG. 43 show that the end of the cables (not shown in FIGS. 42, 43 can contain a male connector 39 or a female connector 51. The male connector 39 can be designed to pass through the hole provided in the insulator 6. The male connector 39 and the female connector 51 protrude from the respective hole 8 over the endface 7 of the insulation block 6. At the inward facing side of the insulation block 6 the male connector 39 and the female connector 51 have connection ends 52 that are connected to the remainder of the cable (not shown in FIG. 43. The male connector 39 and the female connector 51 that pass through the holes 8 of the insulation block 6 have sealings 53 that prevent fluid from entering into the inner side of the housing 3.

The invention claimed is:

1. An electrical coupler for a first car of a multi-car vehicle for connecting to an electrical coupler of a second car of the multi-car vehicle in order to couple ends of cables of the first car to ends of cables of the second car, the electrical coupler comprising:

a housing comprising:

an end opening, and a rim surrounding the end opening, the housing extending along a longitudinal axis (A);

an insulation block arranged in the end opening, the insulation block comprising:

a flat endface facing towards an outside of the housing and arranged perpendicular to the longitudinal axis (A) of the housing, the flat endface situated in an endface plane (B);

wherein the endface has defined therein holes that lead through the insulation block, or recesses that lead into the insulation block;

wherein at least one hole or recess is configured to receive an end of at least one of said cables and such that the at least one cable end protrudes from the hole or the recess over the endface towards the outside of the housing;

a lid having a closed position and an open position;

wherein:

in said closed position, the lid is arranged in front of the endface of the insulation block; and in said open position, the lid is arranged along a side of the housing;

the lid further comprising:

a housing contact surface that, in the closed position of the lid, contacts or is in close proximity to a lid contact surface of the housing arranged on the rim, and wherein the lid contact surface at least partially lies in or runs parallel to the endface plane (B);

wherein (a) an arm is attached to the lid and to the housing so as to enable a rotation of the arm relative to the housing around a rotational axis such that the rotational axis about which the arm rotates relative to the housing is oriented parallel to the endface plane, or (b) a series of arms are connected to each other so as to enable one arm to rotate relative to a neighboring arm about a rotational axis (C), wherein one arm of the series of arms is attached to the housing, and wherein attachment of the arm to the housing enables a rotation of the arm relative to the housing around a rotational axis (D), whereby the rotational axis (D) about which this arm rotates relative to the housing is oriented parallel to the endface plane (B), and wherein one arm of the series of arms is attached to the lid;

wherein a base plane (E) is defined as being oriented perpendicular to the endface plane (B) and contains the rotational axis (D), about which the arm that is attached to the housing rotates relative to the housing;

wherein a reference line that lies in or runs parallel to the endface plane (B) and runs parallel to the base plane (E), runs through a point of the lid contact surface that is furthest away from the base plane (E) in one direction; and wherein a part of the housing contact surface crosses a reference plane (F) that contains the reference line and which reference plane (F) runs perpendicular to the base plane (E) at a point closer to the base plane (E) than the reference line is, as the lid is moved from the closed position to the open position.

2. The electrical coupler according to claim 1, wherein the lid contact surface surrounds the end opening.

3. The electrical coupler according to claim 1, wherein the housing contact surface forms a ring.

4. The electrical coupler according to claim 1, wherein the lid contact surface lies in one plane.

5. The electrical coupler according to claim 1, wherein the housing contact surface lies in one plane.

6. The electrical coupler according to claim 1, wherein:

the series of arms are connected to each other so as to enable one arm to rotate relative to a neighboring arm about a rotational axis (C);

an arm of the series of arms is attached to the housing, and wherein attachment of said arm to the housing enables a rotation of the said arm relative to the housing around a rotational axis (D), whereby the rotational axis (D) about which said arm rotates relative to the housing is oriented parallel to the endface plane (B); and wherein an arm of the series of arms is attached to the lid.

7. The electrical coupler of claim 6, wherein said series of arms comprises:

a first arm; and a second arm, wherein the first arm is attached to the housing to enable a rotation of the first arm relative to the housing around a main axis (D), the first arm and the second arm connected to each other so as to enable the first arm to rotate relative to the second arm about a second axis (C); and wherein the second arm is attached to the lid.

8. The electrical coupler according to claim 7, wherein the first arm includes:

a first end attached to a roller; and a second end that is opposite the first end, the second end being attached to the second arm;

wherein attachment of the first arm to the housing is between the first end and the second end.

9. The electrical coupler according to claim 8, further comprising a support frame configured to support the housing, wherein the housing is slidable relative to the support frame.

10. The electrical coupler according to claim 9, wherein the support frame further comprises a stationary guide rail, and wherein the roller is arranged in the stationary guide rail and moves along the guide rail as the housing slides relative to the support frame.

11. The electrical coupler according to claim 10, further comprising a spring having a first end attached to the housing, and a second end attached to one of the arms of said series of arms.

12. The electrical coupler according to claim 10, wherein the housing further comprises an entry opening arranged opposite the end opening, and wherein the insulation block is insertable into the housing through the entry opening.

13. The electrical coupler according to claim 12, further comprising a back piece that closes the entry opening.

14. The electrical coupler according to claim 13, further comprising a sealing arranged between an outer circumferential surface of the back piece and an inner circumferential surface of the housing.

15. The electrical coupler according to claim 1, further comprising a sealing arranged between an outer circumferential surface of the insulation block and an inner circumferential surface of the housing.

16. The electrical coupler according to claim 1, wherein the insulation block comprises at least two sub-blocks that are attached to one another.

17. A coupler system comprising:

a mechanical coupler for mechanically coupling a first car of a multi-car vehicle to a second car of the multi-car vehicle; and an electrical coupler attached to a portion of the mechanical coupler, the electrical coupler adapted to couple ends of cables of the first car to ends of cables of the second car, the electrical coupler comprising:

a housing comprising:

an end opening, and a rim surrounding the end opening, the housing extending along a longitudinal axis (A);

an insulation block arranged in the end opening, the insulation block comprising:

a flat endface facing towards an outside of the housing and arranged perpendicular to the longitudinal axis (A) of the housing, the flat endface situated in an endface plane (B);

wherein the endface has defined therein holes that lead through the insulation block, or recesses that lead into the insulation block;

wherein at least one hole or recess is configured to receive an end of at least one of said cables and such that the at least one cable end protrudes from the hole or the recess over the endface towards the outside of the housing;

a lid having a closed position and an open position;

wherein:

in said closed position, the lid is arranged in front of the endface of the insulation block; and in said open position, the lid is arranged along a side of the housing;

the lid further comprising:

a housing contact surface that, in the closed position of the lid, contacts or is in close proximity to a lid contact surface of the housing arranged on the rim, and wherein the lid contact surface at least partially lies in or runs parallel to the endface plane (B);

wherein (a) an arm is attached to the lid and to the housing so as to enable a rotation of the arm relative to the housing around a rotational axis such that the rotational axis about which the arm rotates relative to the housing is oriented parallel to the endface plane, or (b) a series of arms are connected to each other so as to enable one arm to rotate relative to a neighboring arm about a rotational axis (C), wherein one arm of the series of arms is attached to the housing, and wherein attachment of the arm to the housing enables a rotation of the arm relative to the housing around a rotational axis (D), whereby the rotational axis (D) about which this arm rotates relative to the housing is oriented parallel to the endface plane (B), and wherein one arm of the series of arms is attached to the lid;

wherein a base plane (E) is defined as being oriented perpendicular to the endface plane (B) and contains the rotational axis (D), about which the arm that is attached to the housing rotates relative to the housing;

wherein a reference line that lies in or runs parallel to the endface plane (B) and runs parallel to the base plane (E), runs through a point of the lid contact surface that is furthest away from the base plane (E) in one direction; and wherein a part of the housing contact surface crosses a reference plane (F) that contains the reference line and which reference plane (F) runs perpendicular to the base plane (E) at a point closer to the base plane (E) than the references line is, as the lid is moved from the closed position to the open position.

18. A method for assembly of an electrical coupler, the electrical coupler having:

a housing having an end opening, an entry opening arranged opposite the end opening, and a rim surrounding the end opening, the housing extending along a longitudinal axis (A); and an insulation block comprising:

a flat endface having defined therein holes that lead through the insulation block, or recesses that lead into the insulation block;

wherein the method comprises:

arranging the endface of the insulation block perpendicular to the longitudinal axis (A) of the housing, the flat endface situated in an endface plane (B);

inserting an end of a cable within a corresponding one of said hole or recess of the insulation block, the end of the cable protruding from the hole or the recess over the endface;

inserting the insulation block through the entry opening into the housing;

attaching the insulation block to the housing such that the insulation block is arranged in the end opening of the housing;

providing a lid having a closed position in which the lid is arranged in front of the endface of the insulation block, and an open position in which the lid is arranged along a side of the housing; wherein the lid further comprises a housing contact surface that in the closed position of the lid contacts or is in close proximity to a lid contact surface of the housing arranged on the rim, wherein the lid contact surface at least partially lies in or runs parallel to the endface plane (B);

attaching one of: (a) an arm to the lid and to the housing to enable a rotation of the arm relative to the housing around a rotational axis such that the rotational axis about which the arm rotates relative to the housing is oriented parallel to the endface plane; and (b) a series of arms to each other to enable one arm to rotate relative to a neighboring arm about a rotational axis (C), wherein one arm of the series of arms is attached to the housing, and wherein attachment of the arm to the housing enables a rotation of the arm relative to the housing around a rotational axis (D), whereby the rotational axis (D) about which this arm rotates relative to the housing is oriented parallel to the endface plane (B), and wherein one arm of the series of arms is attached to the lid;

wherein a base plane (E) is defined as being oriented perpendicular to the endface plane (B) and contains the rotational axis (D), about which the arm that is attached to the housing rotates relative to the housing;

wherein a reference line that lies in or runs parallel to the endface plane (B) and runs parallel to the base plane (E), runs through a point of the lid contact surface that is furthest away from the base plane (E) in one direction;

and wherein a part of the housing contact surface crosses a reference plane (F) that contains the reference line and which reference plane (F) runs perpendicular to the base plane (E) at a point closer to the base plane (E) than the references line is, as the lid is moved from the closed position to the open position.

19. The method of claim 18, further comprising:

closing the entry opening by means of a back piece after insertion of the insulation block through the entry opening; and sealing an outer circumferential surface of the insulation block and an inner circumferential surface of the housing.

20. The method of claim 18, further comprising:

closing the entry opening by means of a back piece after insertion of the insulation block through the entry opening; and sealing an outer circumferential surface of the back piece and an inner circumferential surface of the housing.

* * * * *